(12) United States Patent
Priest

(10) Patent No.: US 12,462,668 B2
(45) Date of Patent: Nov. 4, 2025

(54) SYSTEMS AND METHODS FOR INSTALLING ALARMING SYSTEMS AND ASSOCIATED COMPONENTS AT CELL SITES

(71) Applicant: ETAK Systems, LLC, Huntersville, NC (US)

(72) Inventor: Lee Priest, Charlotte, NC (US)

(73) Assignee: ETAK Systems, LLC, Huntersville, NC (US)

(*) Notice: Subject to any disclaimer, the term of this patent is extended or adjusted under 35 U.S.C. 154(b) by 350 days.

(21) Appl. No.: 18/084,752

(22) Filed: Dec. 20, 2022

(65) Prior Publication Data

US 2024/0203236 A1 Jun. 20, 2024

(51) Int. Cl.
| | |
|---|---|
| G08B 29/02 | (2006.01) |
| G06T 17/00 | (2006.01) |
| H04N 7/18 | (2006.01) |
| H04N 23/698 | (2023.01) |

(52) U.S. Cl.
CPC ............... G08B 29/02 (2013.01); G06T 17/00 (2013.01); H04N 7/185 (2013.01); H04N 23/698 (2023.01)

(58) Field of Classification Search
CPC ........ G08B 29/02; G06T 17/00; H04N 7/185; H04N 23/698
See application file for complete search history.

(56) References Cited

U.S. PATENT DOCUMENTS

| | | | |
|---|---|---|---|
| 9,596,617 B2 | 3/2017 | Priest et al. | |
| 9,654,984 B2 | 5/2017 | Priest et al. | |
| 9,704,292 B2 | 7/2017 | Priest et al. | |
| 9,764,838 B2 | 9/2017 | Priest | |
| 9,881,416 B2 | 1/2018 | Priest | |
| 9,928,750 B2 | 3/2018 | Priest | |
| 9,947,135 B2 | 4/2018 | Priest | |
| 9,959,772 B2 | 5/2018 | Priest | |
| 9,988,140 B2 | 6/2018 | Priest | |
| 10,074,284 B1 | 9/2018 | Priest | |
| 10,109,205 B2 | 10/2018 | Priest | |
| 10,157,546 B2 | 12/2018 | Godwin et al. | |
| 10,187,806 B2 | 1/2019 | Priest | |
| 10,189,566 B2 | 1/2019 | Terry et al. | |
| 10,192,354 B2 | 1/2019 | Terry et al. | |
| 10,227,134 B2 | 3/2019 | Priest | |
| 10,231,133 B2 | 3/2019 | Priest et al. | |
| 10,312,994 B2 | 6/2019 | Priest | |

(Continued)

*Primary Examiner* — Ryan R Yang
(74) *Attorney, Agent, or Firm* — Baratta Law PLLC; Lawrence A. Baratta, Jr.; Ryan Odessa

(57) ABSTRACT

Systems and method for installing an alarming system at a cell site includes installing an alarm controller at a cell site; installing an alarm block at the cell site; coupling the alarm controller to the alarm block by way of a plurality of cables; coupling the alarm block to a plurality of components of the cell site by way of a plurality of cables, wherein the alarm block establishes a connection between the alarm controller and the components; causing one or more cameras to capture a 360 degree view of the cell site; and providing a close-out package, wherein the close-out package provides verification of the alarm controller installation. Various embodiments include utilizing three dimensional (3D) modeling to perform virtual site surveys for verifying the installation of the alarming system.

13 Claims, 22 Drawing Sheets

(56) References Cited

U.S. PATENT DOCUMENTS

| | | |
|---|---|---|
| 10,327,151 B2 | 6/2019 | Priest et al. |
| 10,334,164 B2 | 6/2019 | Terry et al. |
| 10,354,441 B2 | 7/2019 | Godwin et al. |
| 10,382,975 B2 | 8/2019 | Priest |
| 10,395,434 B2 | 8/2019 | Priest |
| 10,397,802 B2 | 8/2019 | Priest |
| 10,456,906 B2 | 10/2019 | Priest et al. |
| 10,462,023 B1* | 10/2019 | Montcalm ........... H04M 3/5175 |
| 10,475,239 B1 | 11/2019 | Priest |
| 10,497,112 B2 | 12/2019 | Hummer et al. |
| 10,580,199 B2 | 3/2020 | Priest et al. |
| 10,650,582 B2 | 5/2020 | Priest et al. |
| 10,713,961 B2 | 7/2020 | Priest |
| 10,720,652 B2 | 7/2020 | Perry et al. |
| 10,723,483 B2 | 7/2020 | Priest et al. |
| 10,728,767 B2 | 7/2020 | Priest et al. |
| 10,789,853 B2 | 9/2020 | Priest |
| 10,827,363 B2 | 11/2020 | Terry et al. |
| 10,856,153 B2 | 12/2020 | Terry et al. |
| 10,959,107 B2 | 3/2021 | Priest et al. |
| 11,101,517 B2 | 8/2021 | Hummer et al. |
| 2013/0003318 A1* | 1/2013 | Doyle ................. G08B 25/14 361/729 |
| 2016/0309341 A1 | 10/2016 | Priest et al. |
| 2016/0320775 A1 | 11/2016 | Priest |
| 2016/0360428 A1 | 12/2016 | Priest |
| 2017/0199646 A1 | 7/2017 | Priest |
| 2017/0257778 A1 | 9/2017 | Priest |
| 2017/0358213 A1 | 12/2017 | Priest |
| 2017/0358223 A1 | 12/2017 | Priest |
| 2017/0358224 A1 | 12/2017 | Priest |
| 2017/0358225 A1 | 12/2017 | Priest |
| 2017/0366980 A1 | 12/2017 | Priest et al. |
| 2018/0034017 A1 | 2/2018 | Erickson et al. |
| 2018/0034022 A1 | 2/2018 | Hummer et al. |
| 2018/0034036 A1 | 2/2018 | Perry et al. |
| 2018/0044154 A1 | 2/2018 | Priest |
| 2018/0047994 A1 | 2/2018 | Perry et al. |
| 2018/0158236 A1 | 6/2018 | Priest |
| 2018/0276995 A1 | 9/2018 | Priest |
| 2018/0312348 A1 | 11/2018 | Griffin et al. |
| 2018/0319497 A1 | 11/2018 | Priest |
| 2018/0350245 A1 | 12/2018 | Priest |
| 2019/0035285 A1 | 1/2019 | Priest |
| 2019/0043368 A1 | 2/2019 | Priest |
| 2019/0080619 A1 | 3/2019 | Priest |
| 2019/0295427 A1 | 9/2019 | Priest |
| 2019/0325760 A1 | 10/2019 | Priest |
| 2019/0355262 A1 | 11/2019 | Priest |
| 2019/0355263 A1 | 11/2019 | Priest |
| 2020/0005651 A1 | 1/2020 | Priest |
| 2020/0005652 A1 | 1/2020 | Priest |
| 2020/0035110 A1 | 1/2020 | Priest |
| 2020/0051445 A1 | 2/2020 | Priest |
| 2020/0077164 A1 | 3/2020 | Gentile et al. |
| 2020/0090527 A1 | 3/2020 | Priest |
| 2020/0160730 A1 | 5/2020 | Priest |
| 2020/0160734 A1 | 5/2020 | Priest |
| 2020/0219407 A1 | 7/2020 | Priest |
| 2020/0234600 A1 | 7/2020 | Priest |
| 2020/0250998 A1 | 8/2020 | Priest |
| 2020/0258401 A1 | 8/2020 | Priest |
| 2020/0265727 A1 | 8/2020 | Priest |
| 2020/0286390 A1 | 9/2020 | Priest |
| 2020/0288330 A1 | 9/2020 | Priest et al. |
| 2020/0354083 A1 | 11/2020 | Priest |
| 2020/0354084 A1 | 11/2020 | Priest |
| 2020/0354170 A1 | 11/2020 | Priest |
| 2020/0355570 A1 | 11/2020 | Priest |
| 2020/0355571 A1 | 11/2020 | Priest |
| 2020/0355572 A1 | 11/2020 | Priest |
| 2020/0391882 A1 | 12/2020 | Terry et al. |
| 2020/0396361 A1 | 12/2020 | Terry et al. |
| 2020/0396422 A1 | 12/2020 | Terry et al. |
| 2020/0402318 A1 | 12/2020 | Terry et al. |
| 2020/0404175 A1 | 12/2020 | Terry et al. |
| 2021/0124851 A1 | 4/2021 | Priest |
| 2021/0150096 A1 | 5/2021 | Priest |
| 2021/0150097 A1 | 5/2021 | Priest |
| 2021/0150098 A1 | 5/2021 | Priest |
| 2021/0329032 A1* | 10/2021 | Shaw ................. H04L 63/1425 |

\* cited by examiner

SYSTEMS AND METHODS FOR INSTALLING ALARMING SYSTEMS AND ASSOCIATED COMPONENTS AT CELL SITES

FIELD OF THE DISCLOSURE

The present disclosure relates generally to cellular site device installation and auditing systems and methods. More particularly, the present disclosure relates to systems and methods for installing alarming systems and associated components at cell sites.

BACKGROUND OF THE DISCLOSURE

In the process of planning, installing, maintaining, and operating cell sites and cell towers, site surveys are performed for testing, auditing, planning, diagnosing, inventorying, etc. Conventional site surveys involve physical site access including access to the top of the cell tower, the interior of any buildings, cabinets, shelters, huts, hardened structures, etc. at the cell site, and the like. With over 200,000 cell sites in the U.S., geographically distributed everywhere, site surveys can be expensive, time-consuming, and complex. In order to limit the amount of cell site visits, when installing components such as alarming systems, it is advantageous to utilize virtual site surveys for verifying such installations. The present disclosure provides systems and methods for installing and verifying installations of alarming systems at cell sites.

BRIEF SUMMARY OF THE DISCLOSURE

In an embodiment, a method for installing an alarming system at a cell site includes installing an alarm controller at a cell site; installing an alarm block at the cell site; coupling the alarm controller to the alarm block by way of a plurality of cables; coupling the alarm block to a plurality of components of the cell site by way of a plurality of cables, wherein the alarm block establishes a connection between the alarm controller and the components; causing one or more cameras to capture a 360 degree view of the cell site; and providing a close-out package, wherein the close-out package provides verification of the alarm controller installation.

Various embodiments additionally include, wherein the alarm controller and alarm block are installed in a shelter of the cell site, and the plurality of cables are coupled to the plurality of components within the shelter of the cell site. The steps can include causing the one or more cameras to capture a 360 degree view of an interior of the shelter. The steps can further include verifying that the plurality of cables are correctly coupled based on the 360 degree view. The steps can further include attaching one or more tags to each of the plurality of cables for identification. The one or more tags identify each cable based on their connection between the alarm controller and the alarm block. The one or more tags identify each cable based on their connection between the alarm block and the components. The one or more tags are positioned to be visible in the 360 degree view. The plurality of components are any of components associated with the operation of the cell site, and alarming devices. Causing the one or more cameras to capture a 360 degree view of the cell site can be performed remotely. The steps can further include sending the close-out package to one or more of a cell site owner and a cell site operator. The steps can further include creating a three dimensional (3D) model of the cell site, and performing a virtual site survey to verify the installation of the alarming system.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
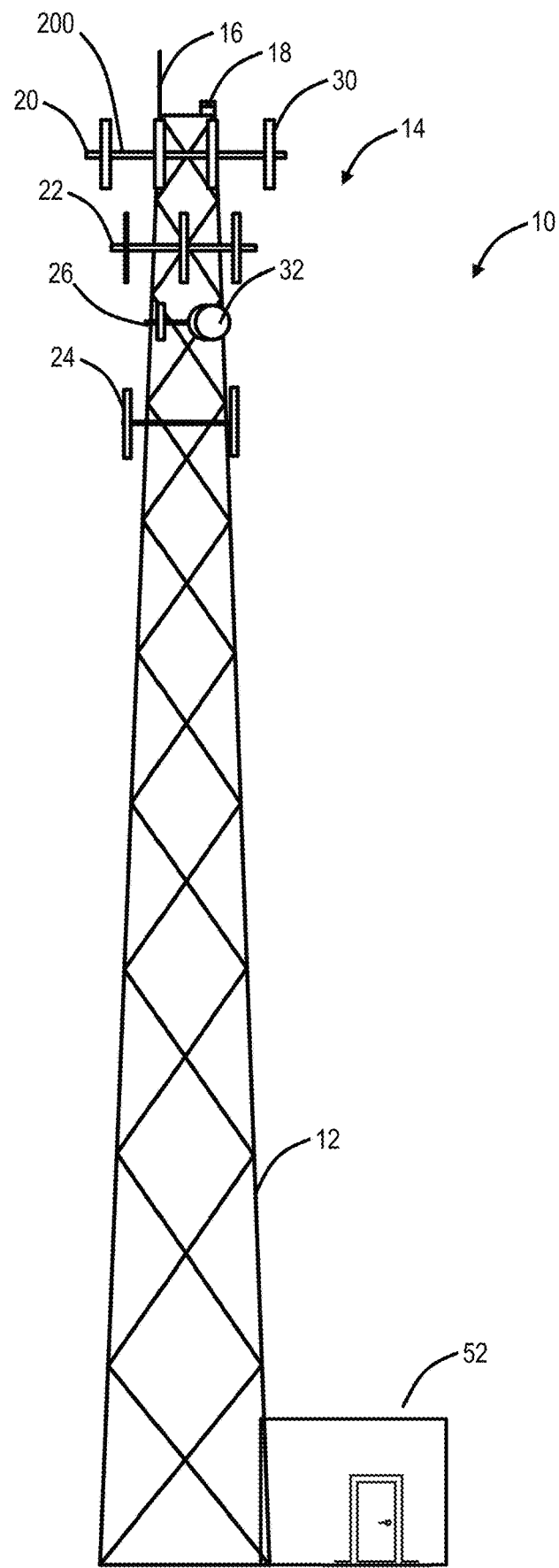
FIG. 1 is a diagram of a side view of an exemplary cell site.

The present disclosure relates to systems and methods for a virtual 360-degree view modification of a telecommunications site, such as a cell site, for purposes of planning, engineering, and installation, and the like. The systems and methods include a three-dimensional (3D) model of the telecommunications site, including exterior and surrounding geography as well as internal facilities. Various techniques are utilized for data capture including the use of an Unmanned Aerial Vehicle (UAV) and various camera systems. With the 3D model, various modifications and additions are added after the fact, i.e., to a preexisting environment, for the purposes of planning, engineering, and installation. Advantageously, the modified 3D model saves time in site inspection and engineering, improves the accuracy of planning and installation, and decreases the after installation changes increasing the overall planning phase of construction and telecommunication operations.

Further, the present disclosure relates to systems and methods for a virtual 360-degree view of a telecommunications site, such as exterior and interior of a cell site, for purposes of site surveys, site audits, and the like. The objective of the virtual 360 view is to provide an environment, viewable via a display, where personnel can be within the telecommunications site remotely. That is, the purpose of the virtual 360 view creation is to allow industry workers to be within the environment of the location captured (i.e., telecommunications cellular site). Within this environment, there is an additional augmented reality where a user can call information from locations of importance. This environment can serve as a bid walk, pre-construction verification, post-installation verification, or simply as an inventory measurement for companies. The information captured with the virtual 360 view captures the necessary information to create action with respect to maintenance, upgrades, or the like. This actionable information creates an environment that can be passed from tower owner, carrier owner, construction company, and installation crews with the ease of an email with a Uniform Resource Locator (URL) link to the web. This link can be sent to a user's phone, Virtual Reality (VR) headset, computer, tablet, etc. This allows for a telecom engineer to be within the reality of the cell site or telecommunications site from their desk. For example, the engineer can click on an alarm controller panel and a photo is overlaid in the environment showing the engineer various information.

Further, in an exemplary embodiment, the present disclosure relates to systems and methods for obtaining accurate three-dimensional (3D) modeling data using a multiple camera apparatus. Specifically, the multiple camera apparatus contemplates use in a shelter or the like to simultaneously obtain multiple photos for purposes of developing a three-dimensional (3D) model of the shelter for use in a cell site audit or the like. The multiple camera apparatus can be portable or mounted within the shelter. The multiple camera apparatus includes a support beam with a plurality of cameras associated therewith. The plurality of cameras each face a different direction, angle, zoom, etc. and are coordinated to simultaneously obtain photos. Once obtained, the photos can be used to create a 3D model. Advantageously, the multiple camera apparatus streamlines data acquisition time as well as ensures the proper angles and photos are obtained. The multiple camera apparatus also is simple to use allowing untrained technicians the ability to easily perform data acquisition.

Exemplary Cell Site

Referring to FIG. 1, in an exemplary embodiment, a diagram illustrates a side view of an exemplary cell site 10. The cell site 10 includes a cell tower 12, and a shelter 52. The cell tower 12 can be any type of elevated structure, such as 100-200 feet/30-60 meters tall. Generally, the cell tower 12 is an elevated structure for holding cell site components 14. The cell tower 12 may also include a lighting rod 16 and a warning light 18. Of course, there may various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g., there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHZ, 1.9 GHZ, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

Cell Site Audit

In general, a cell site audit is performed to gather information and identify a state of the cell site 10. This is used to check the installation, maintenance, and/or operation of the cell site 10. Various aspects of the cell site audit can include, without limitation:

---

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support
Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose or Cross-Threaded Coax Connectors
Verify Return ("Ret") Cables
Verify Ret Connectors
Verify Ret Grounding
Verify Ret Installation
Verify Ret Lightning Protection Unit (LPI)
Check for Shelter/Cabinet Penetrations
Verify Surge Arrestor Installation/Grounding
Verify Site Cleanliness
Verify LTE GPS Antenna Installation
Verify Installation of Alarming System

---

Of note, the cell site audit includes gathering information at and inside the shelter or cabinet 52, on the cell tower 12, and at the cell site components 14.

Exemplary Hardware

Figure 2:
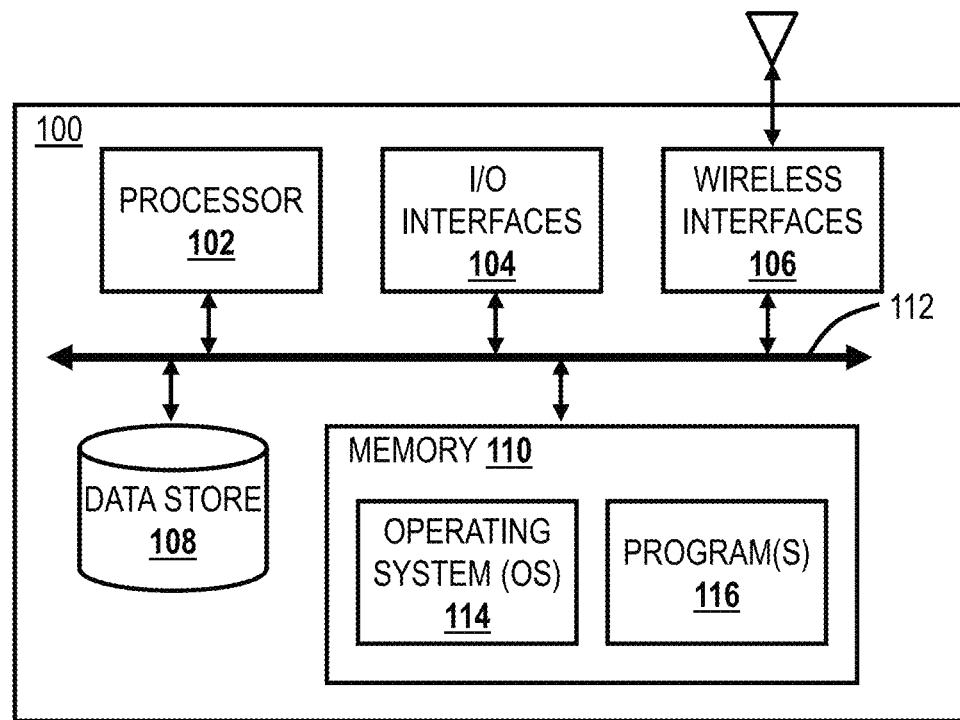
FIG. 2 is a block diagram of a mobile device.

Referring to FIG. 2, in an exemplary embodiment, a block diagram illustrates a mobile device 100, which may be used for the cell site audit or the like. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 2 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an exemplary embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e., camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with a UAV for command and control as well as to relay data therebetween. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 2, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end-user functionality with the mobile device 100, including performing various aspects of the systems and methods described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, the software can include instructions executable by a processor that, in response to such execution, cause a processor or any other circuitry to perform a set of operations, steps, methods, processes, algorithms, etc.

Photo Collections

As part of the cell site audit generally, camera systems and/or the mobile device 100 can be used to document various aspects of the cell site 10 by taking photos or video. For example, the camera systems and mobile device 100 can be used to take photos or video on the ground in or around the shelter or cabinet 52 and a UAV can be used to take photos or video up the cell tower 12 and of the cell site components 14. The photos and video can be stored in any of a UAV, the mobile device 100, the cloud, the camera system, etc.

Data Capture—Cell Site Audit

Cameras can be used to capture various pieces of data. That is, a camera is equivalent to the engineer/technician's own eyes, thereby eliminating the need for the engineer/technician to physically climb the tower or inspect an installation in the shelter 52. One important aspect of the cell site audit is physically collecting various pieces of information—either to check records for consistency or to establish a record. For example, the data capture can include determining equipment module types, locations, connectivity, serial numbers, component tags, etc. from photos. The data capture can include determining physical dimensions from photos or from GPS such as the cell tower 12 height, width, depth, etc. The data capture can also include visual inspection of any aspect of the cell site 10, cell tower 12, cell site components 14, etc. including, but not limited to, physical characteristics, mechanical connectivity, cable connectivity, and the like.

The data capture can also include checking the lighting rod 16 and the warning light 18 on the cell tower 12. Also, with additional equipment on a UAV, the UAV can be configured to perform maintenance such as replacing the warning light 18, etc. The data capture can also include checking maintenance status of the cell site components 14 visually as well as checking associated connection status. Another aspect of the cell site audit can include checking the structural integrity of the cell tower 12 and the cell site components 14 via photos from the UAV.

Cell Site Operations

There are generally two entities associated with cell sites—cell site owners and cell site operators. Generally, cell site owners can be viewed as real estate property owners and managers. Typical cell site owners may have a vast number of cell sites, such as tens of thousands, geographically dispersed. The cell site owners are generally responsible for the real estate, ingress and egress, structures on site, the cell tower itself, etc. Cell site operators generally include wireless service providers who generally lease space on the cell tower and in the structures for antennas and associated wireless backhaul equipment. There are other entities that may be associated with cell sites as well including engineering firms, installation contractors, and the like. All of these entities have a need for the various systems and methods described herein. Specifically, cell site owners can use the systems and methods for real estate management functions, audit functions, installation verification, etc. Cell site operators can use the systems and methods for equipment audits, troubleshooting, site engineering, etc. Of course, the systems and methods described herein can be provided by an engineering firm or the like contracted to any of the above entities or the like. The systems and methods described herein provide these entities time savings, increased safety, better accuracy, lower cost, and the like.

3D Modeling

Again, the cell site 10, the cell tower 12, the cell site components 14, the shelter 52, etc. are as described herein. To develop a 3D model, cameras are configured to take various photos, at different angles, orientations, heights, etc. to develop a 360-degree view. For post-processing, it is important to differentiate between different photos accurately. In various exemplary embodiments, the systems and methods utilize accurate location tracking for each photo taken. It is important for accurate correlation between photos to enable construction of a 3D model from a plurality of 2D photos. The photos can all include multiple location identifiers (i.e., where the photo was taken from, height and exact location). In an exemplary embodiment, the photos can each include at least two distinct location identifiers, such as from GPS or GLONASS. GLONASS is a "GLObal NAvigation Satellite System" which is a space-based satellite navigation system operating in the radio navigation-satellite service and used by the Russian Aerospace Defence Forces. It provides an alternative to GPS and is the second alternative navigational system in operation with global coverage and of comparable precision. The location identifiers are tagged or embedded to each photo and indicative of the location of the camera and where and when the photo was taken. These location identifiers are used with objects of interest identified in the photo during post-processing to create the 3D model.

During the photo capture, cameras are configured to take various photos of different aspects of the cell site 10 including the cell tower 12, the cell site components 14, the exterior and interior of the shelter 52, as well as surrounding areas. These photos are each tagged or embedded with multiple location identifiers. The cameras can take hundreds or even thousands of photos, each with the appropriate location identifiers. For an accurate 3D model, at least hundreds of photos are required. The photos can be manually taken based on operator commands. Of course, a combination of automated capture and manual capture is also contemplated.

Figure 3:
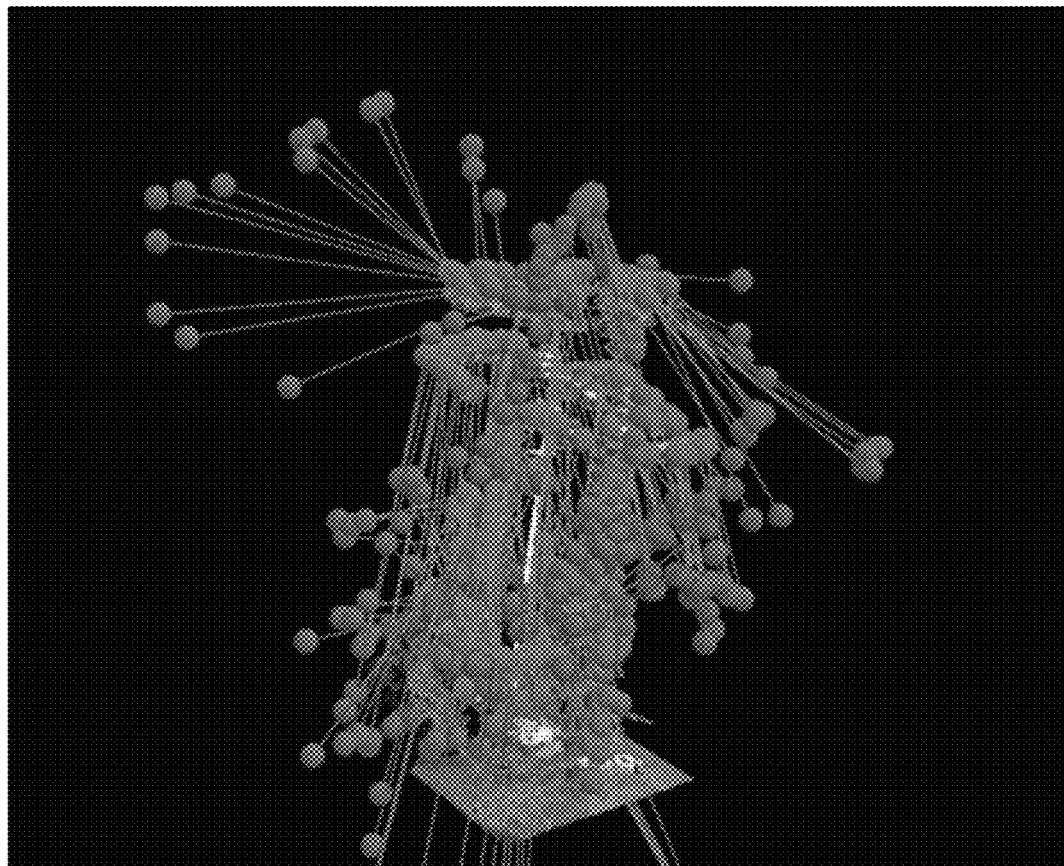
FIG. 3 is a side view of an exemplary flight of the UAV at the cell site.

Referring to FIG. 3, in an exemplary embodiment, a side view illustrates an exemplary flight of a UAV at the cell site 10. FIG. 3 shows circles in the side view at locations where photos were taken. Note, photos are taken at different elevations, orientations, angles, and locations.

The photos can be stored locally in the UAV and/or transmitted wirelessly to a mobile device, controller, server, etc. Once the flight is complete, and the photos are provided to an external device from the UAV (e.g., mobile device, controller, server, cloud service, or the like), post-processing occurs to combine the photos or "stitch" them together to construct the 3D model. While described separately, the post-processing could occur in the UAV provided its computing power is capable.

Figure 4:
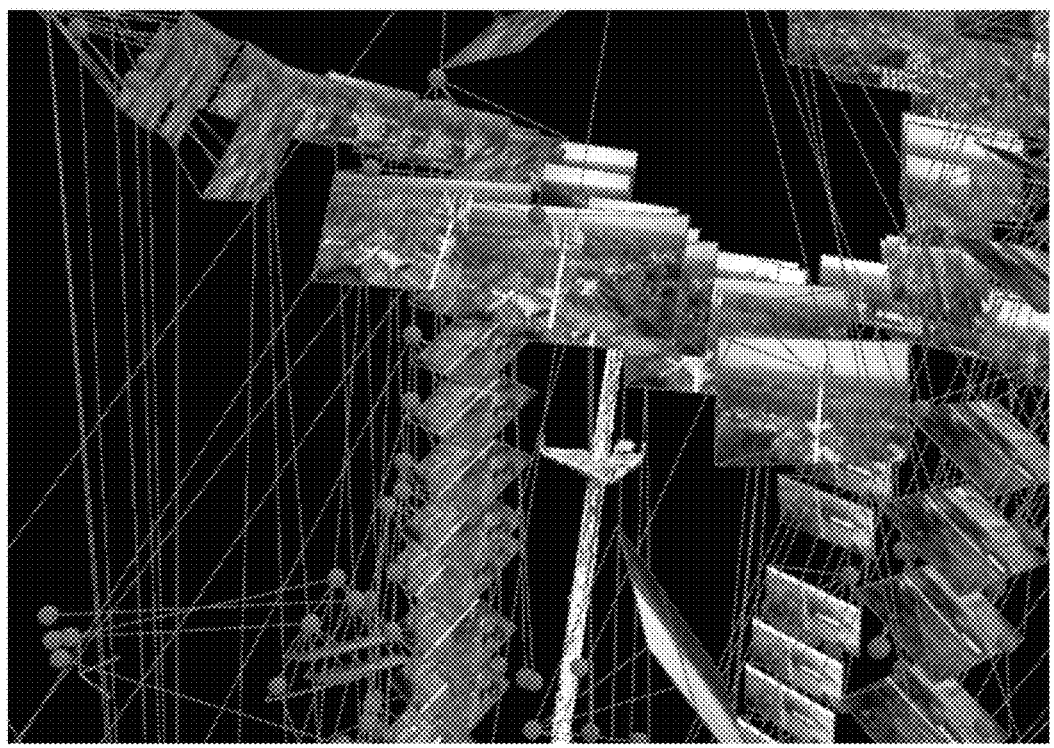
FIG. 4 is a logical diagram of a portion of a cell tower along with associated photos taken by the UAV at different points relative thereto.

Referring to FIG. 4, in an exemplary embodiment, a logical diagram illustrates a portion of a cell tower 12 along with associated photos taken by a UAV at different points relative thereto. Specifically, various 2D photos are logically shown at different locations relative to the cell tower 12 to illustrate the location identifiers and the stitching together of the photos.

Figure 5:
FIG. 5 is a screenshot of a GUI associated with post-processing photos from the UAV.

Referring to FIG. 5, in an exemplary embodiment, a screen shot illustrates a Graphic User Interface (GUI) associated with post-processing photos from the UAV. Again, once the UAV has completed taking photos of the cell site 10, the photos are post-processed to form a 3D model. The systems and methods contemplate any software program capable of performing photogrammetry. In the example of FIG. 5, there are 128 total photos. The post-processing includes identifying visible points across the multiple points, i.e., objects of interest. For example, the objects of interest can be any of the cell site components 14, such as antennas. The post-processing identifies the same object of interest across different photos, with their corresponding location identifiers, and builds a 3D model based on multiple 2D photos.

Figure 6:
FIG. 6 is a screenshot of a 3D model constructed from a plurality of 2D photos taken from the UAV as described herein.

Referring to FIG. 6, in an exemplary embodiment, a screen shot illustrates a 3D model constructed from a plurality of 2D photos taken from the UAV as described herein. Note, the 3D model can be displayed on a computer or another type of processing device, such as via an application, a Web browser, or the like. The 3D model supports zoom, pan, tilt, etc.

Figure 7:
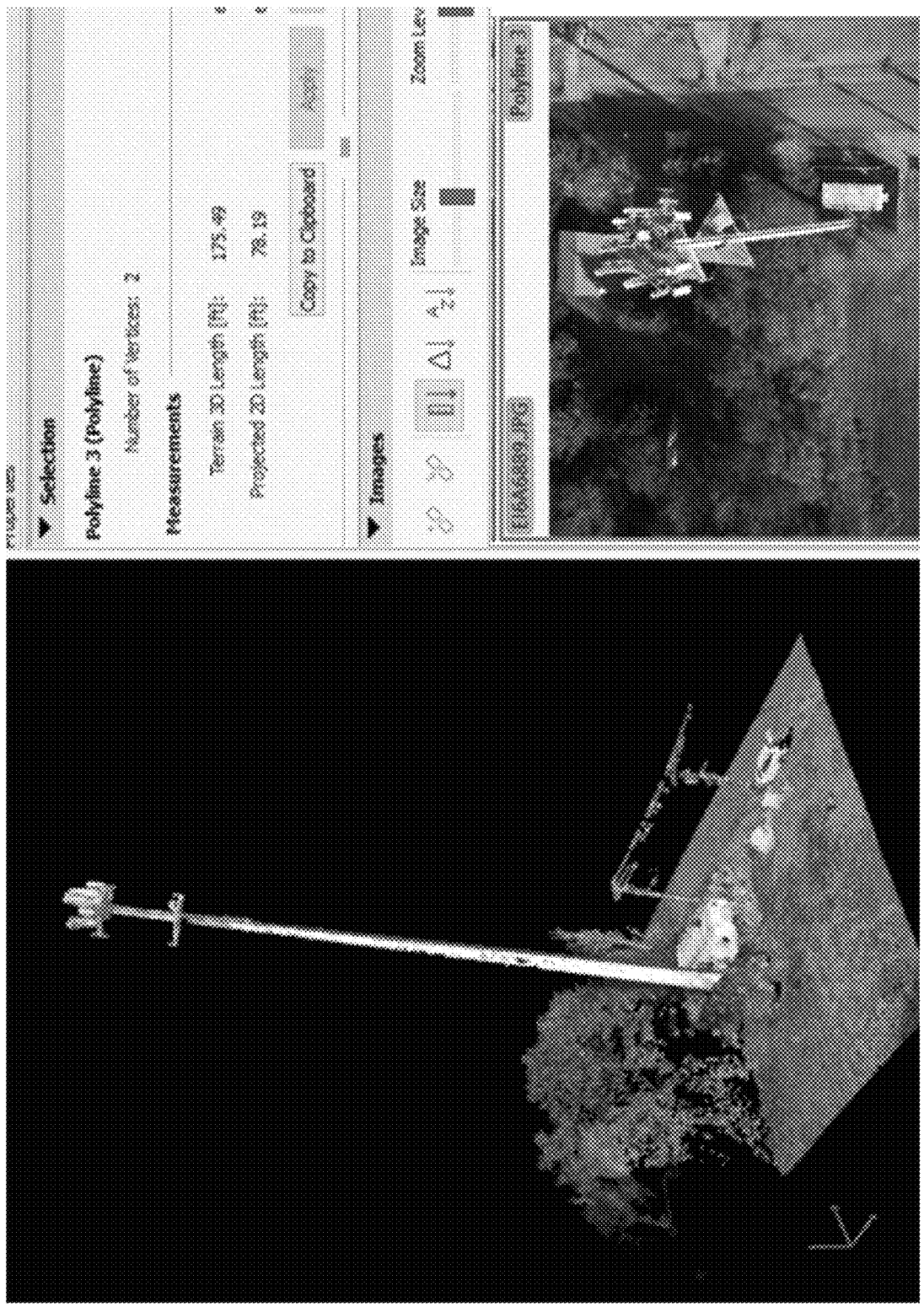
FIGS. 7-12 are various screenshots of GUIs associated with a 3D model of a cell site based on photos taken from the UAV as described herein.
Figure 8:
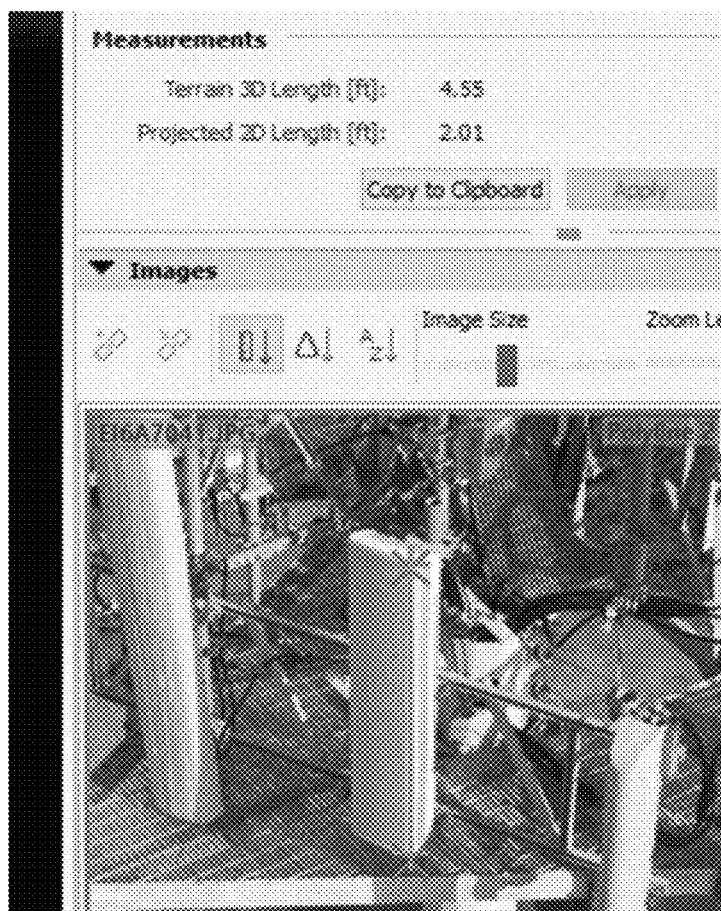
Figure 9:
Figure 10:

Referring to FIGS. 7-12, in various exemplary embodiments, various screenshots illustrate GUIs associated with a 3D model of a cell site based on photos taken from a UAV and/or camera system as described herein. FIG. 7 is a GUI illustrating an exemplary measurement of an object, i.e., the cell tower 12, in the 3D model. Specifically, using a point and click operation, one can click on two points such as the top and bottom of the cell tower and the 3D model can provide a measurement, e.g., 175' in this example. FIG. 8 illustrates a close-up view of a cell site component 14 such as an antenna and a similar measurement made thereon using point and click, e.g., 4.55' in this example. FIGS. 9 and 10 illustrate an aerial view in the 3D model showing surrounding geography around the cell site 10. From these views, the cell tower 12 is illustrated with the surrounding environment including the structures, access road, fall line, etc. Specifically, the 3D model can assist in determining a fall line which is anywhere in the surroundings of the cell site 10 where the cell tower 12 may fall. Appropriate considerations can be made based thereon.

Figure 11:
Figure 12:
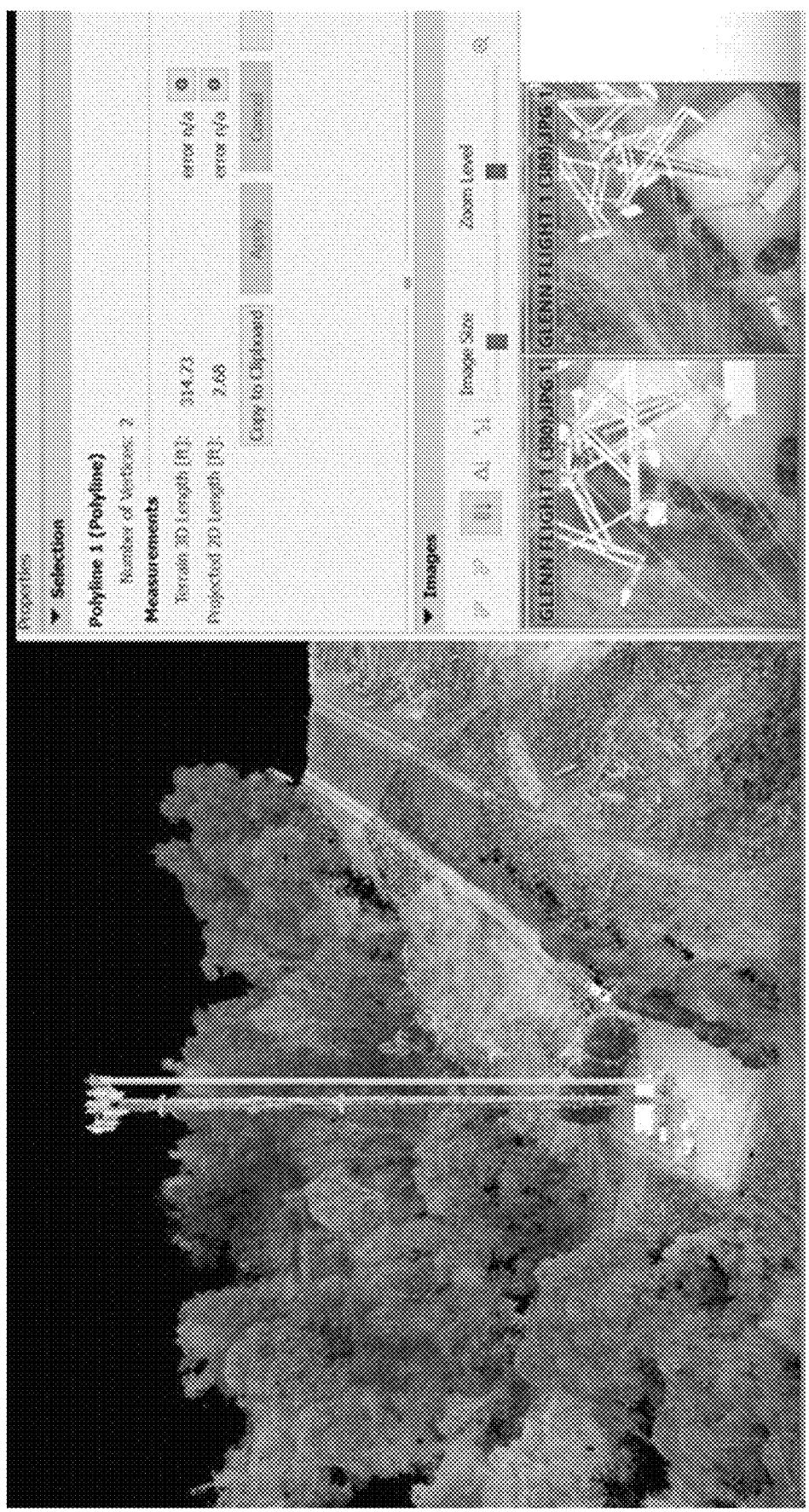

FIGS. 11 and 12 illustrate the 3D model and associated photos on the right side. One useful aspect of the 3D model GUI is an ability to click anywhere on the 3D model and bring up corresponding 2D photos. Here, an operator can click anywhere and bring up full-sized photos of the area. Thus, with the systems and methods described herein, the 3D model can measure and map the cell site 10 and surrounding geography along with the cell tower 12, the cell site components 14, etc. to form a comprehensive 3D model. There are various uses of the 3D model to perform cell site audits including checking tower grounding; sizing and placement of antennas, piping, and other cell site components 14; providing engineering drawings; determining characteristics such as antenna azimuths; and the like.

It will be appreciated that the various steps and methods described herein include capturing and processing photos in a similar manner for an interior of the shelter 52 of the cell site 10. In various embodiments, various camera systems are adapted to capture photos of the interior of the shelter 52 similar to the UAV.

Figure 13:
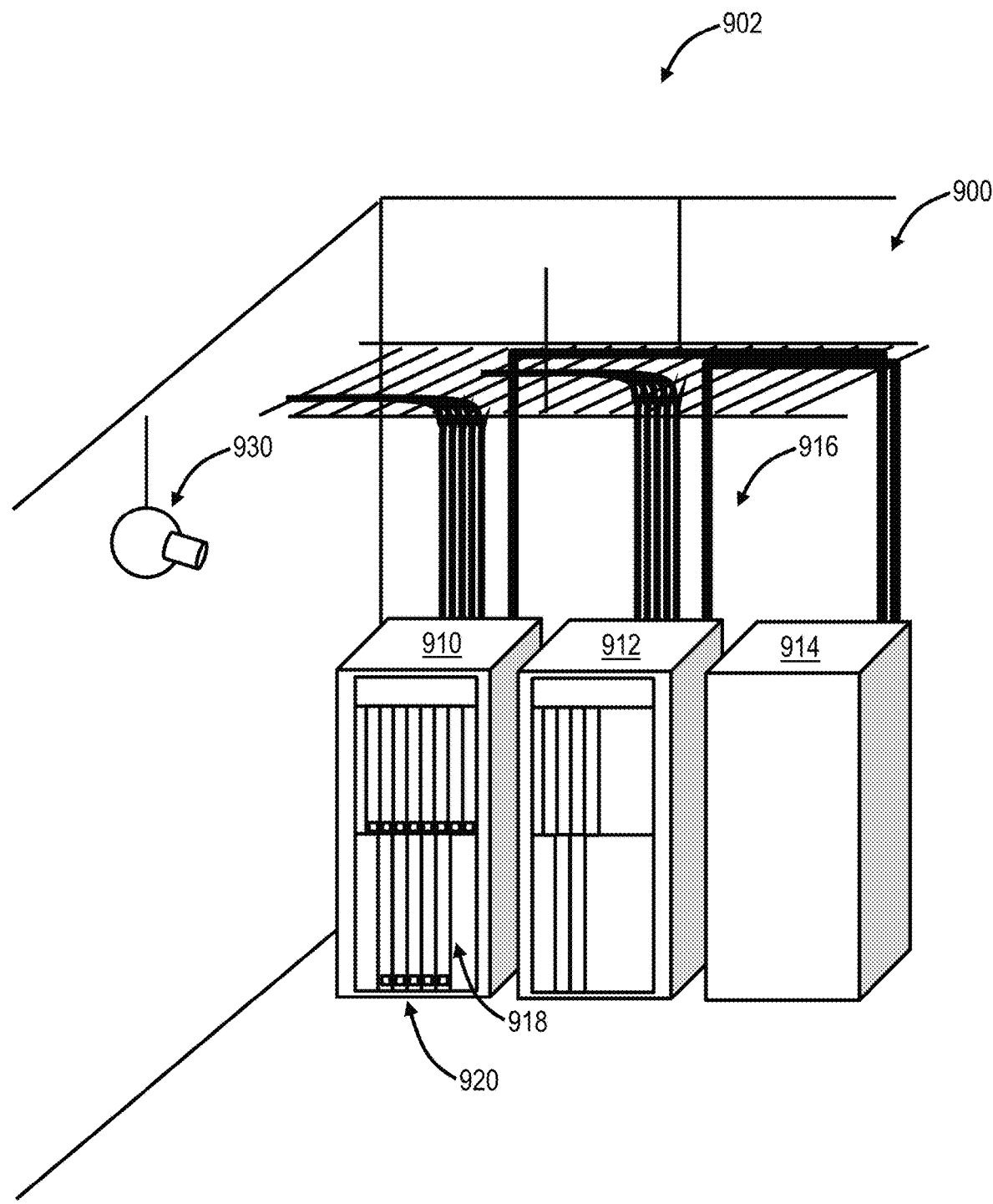
FIG. 13 is a diagram of an exemplary interior of a building, such as a shelter or cabinet, at the cell site.

The above description explains 3D modeling and photo data capture using a UAV. Additionally, the photo data capture can be through other means, including portable cameras, fixed cameras, heads-up displays (HUD), head-mounted cameras, and the like. That is the systems and methods described herein contemplate the data capture through any available technique. The UAV will be difficult to obtain photos inside the buildings, i.e., the shelter or cabinet 52. Referring to FIG. 13, in an exemplary embodiment, a diagram illustrates an exemplary interior 900 of a building 902, such as the shelter or cabinet 52, at the cell site 10. Generally, the building 902 houses equipment associated with the cell site 10 such as wireless RF terminals 910 (e.g., LTE terminals), wireless backhaul equipment 912, power distribution 914, and the like. Generally, wireless RF terminals 910 connect to the cell site components 14 for providing associated wireless service. The wireless backhaul equipment 912 includes networking equipment to bring the associated wireless service signals to a wireline network, such as via fiber optics or the like. The power distribution 914 provides power for all of the equipment such as from the grid as well as a battery backup to enable operation in the event of power failures. Of course, additional equipment and functionality are contemplated in the interior 900.

The terminals 910, equipment 912, and the power distribution 914 can be realized as rack or frame mounted hardware with cabling 916 and with associated modules 918. The modules 918 can be pluggable modules which are selectively inserted in the hardware and each can include unique identifiers 920 such as barcodes, Quick Response (QR) codes, RF Identification (RFID), physical labeling, color coding, or the like. Each module 918 can be unique with a serial number, part number, and/or functional identifier. The modules 918 are configured as needed to provide the associated functionality of the cell site.

The systems and methods include, in addition to or instead of the aforementioned photo capture via the UAV, photo data capture in the interior 900 for 3D modeling and for virtual site surveys. The photo data capture can be performed by a fixed, rotatable camera 930 located in the interior 900. The camera 930 can be communicatively coupled to a Data Communication Network (DCN), such as through the wireless backhaul equipment 912 or the like. The camera 930 can be remotely controlled, such as by an engineer performing a site survey from his or her office. Other techniques of photo data capture can include an on-site technician taking photos with a camera and uploading them to a cloud service or the like. Again, the systems and methods contemplate any type of data capture.

Again, with a plurality of photos, e.g., hundreds, it is possible to utilize photogrammetry to create a 3D model of the interior 900 (as well as a 3D model of the exterior as described above). The 3D model is created using physical cues in the photos to identify objects of interest, such as the modules 918, the unique identifiers 920, or the like.

Virtual Site Survey

Virtual site surveys are associated with the cell site 10 and utilizes three-dimensional (3D) models for remote performance, i.e., at an office as opposed to in the field. The virtual site survey process includes obtaining a plurality of photographs of a cell site including a cell tower and one or more buildings and interiors thereof; subsequent to the obtaining, processing the plurality of photographs to define a three dimensional (3D) model of the cell site based on one or more objects of interest in the plurality of photographs; and remotely performing a site survey of the cell site utilizing a Graphical User Interface (GUI) of the 3D model to collect and obtain information about the cell site, the cell tower, the one or more buildings, and the interiors thereof. The 3D model can be a combination of an exterior of the cell site including the cell tower and associated cell site components thereon, geography local to the cell site, and the interiors of the one or more buildings at the cell site, and the 3D model can include detail at a module level in the interiors. The 3D model can also include only the interiors of the one or more buildings at the cell site.

The remotely performing the site survey can include determining equipment location on the cell tower and in the interiors; measuring distances between the equipment and within the equipment to determine actual spatial location; and determining connectivity between the equipment based on associated cabling. The remotely performing the site survey can include planning for one or more of new equipment and changes to existing equipment at the cell site through drag and drop operations in the GUI, wherein the GUI includes a library of equipment for the drag and drop operations; and, subsequent to the planning, providing a list of the one or more of the new equipment and the changes to the existing equipment based on the library, for implementation thereof. The remotely performing the site survey can include providing one or more of the photographs of an associated area of the 3D model responsive to an operation in the GUI. The virtual site survey process can include rendering a texture map of the interiors responsive to an operation in the GUI.

The virtual site survey process can include performing an inventory of equipment at the cell site including cell site components on the cell tower and networking equipment in the interiors, wherein the inventory from the 3D model uniquely identifies each of the equipment based on associated unique identifiers. The remotely performing the site survey can include providing an equipment visual in the GUI of a rack and all associated modules therein. The obtaining can include a UAV obtaining the photographs on the cell tower, and the obtaining includes one or more of a fixed and portable camera obtaining the photographs in the interior. The obtaining can be performed by an on-site technician at the cell site, and the site survey can be remotely performed.

In another exemplary embodiment, an apparatus adapted to perform a virtual site survey of a cell site utilizing three-dimensional (3D) models for remote performance includes a network interface and a processor communicatively coupled to one another; and memory storing instructions that, when executed, cause the processor to receive, via the network interface, a plurality of photographs of a cell site including a cell tower and one or more buildings and interiors thereof; process the plurality of photographs to define a three dimensional (3D) model of the cell site based on one or more objects of interest in the plurality of photographs, subsequent to receiving the photographs; and provide a Graphical User Interface of the 3D model for remote performance of a site survey of the cell site utilizing the 3D model to collect and obtain information about the cell site, the cell tower, the one or more buildings, and the interiors thereof.

In a further exemplary embodiment, a non-transitory computer readable medium includes instructions that, when executed, cause one or more processors to perform the steps of receiving a plurality of photographs of a cell site including a cell tower and one or more buildings and interiors thereof; processing the plurality of photographs to define a three dimensional (3D) model of the cell site based on one or more objects of interest in the plurality of photographs, subsequent to receiving the photographs; and rendering a Graphical User Interface of the 3D model for remote performance of a site survey of the cell site utilizing the 3D model to collect and obtain information about the cell site, the cell tower, the one or more buildings, and the interiors thereof.

The virtual site survey can perform anything remotely that traditionally would have required on-site presence, including the various aspects of the cell site audit described herein. The GUI of the 3D model can be used to check plumbing of coaxial cabling, connectivity of all cabling, automatic identification of cabling endpoints such as through unique identifiers detected on the cabling, and the like. The GUI can further be used to check power plant and batteries, power panels, physical hardware, grounding, heating and air conditioning, generators, safety equipment, and the like.

The 3D model can be utilized to automatically provide engineering drawings, such as responsive to the planning for new equipment or changes to existing equipment. Here, the GUI can have a library of equipment (e.g., approved equipment and vendor information can be periodically imported into the GUI). Normal drag and drop operations in the GUI can be used for equipment placement from the library. Also, the GUI system can include error checking, e.g., a particular piece of equipment is incompatible with placement or in violation of policies, and the like.

Close-Out Audit Systems and Methods

Again, a close-out audit is done to document and verify the work performed at the cell site 10, including interiors of buildings such as the shelter 52. The systems and methods eliminate the separate third-party inspection firm for the close-out audit. The systems and methods include the installers (i.e., from the third-party installation firm, the owner, the operator, etc.) performing video capture subsequent to the installation and maintenance and using various techniques to obtain data from the video capture for the close-out audit. The close-out audit can be performed off-site with the data from the video capture thereby eliminating unnecessary tower climbs, site visits, and the like.

In an exemplary embodiment, a close-out audit performed at a cell site can be performed subsequent to maintenance or installation work. The close-out audit method includes, subsequent to the maintenance or installation work, obtaining video capture of cell site components associated with the work; subsequent to the video capture, processing the video capture to obtain data for the close-out audit, wherein the processing comprises identifying the cell site components associated with the work; and creating a close-out audit package based on the processed video capture, wherein the close-out audit package provides verification of the maintenance or installation work and outlines that the maintenance or installation work was performed in a manner consistent with an operator or owner's guidelines.

The video capture can be performed by a mobile device and one or more of locally stored thereon and transmitted from the mobile device. The video capture can also be performed by a mobile device which wirelessly transmits a live video feed, and the video capture is remotely stored from the cell site. The video capture can also be performed by an Unmanned Aerial Vehicle (UAV) flown at the cell site and/or camera systems within buildings of the cell site. Further, the video capture can be a live video feed with two-way communication between an installer associated with the maintenance or installation work and personnel associated with the operator or owner to verify the maintenance or installation work. For example, the installer and the personnel can communicate to go through various items in the maintenance or installation work to check/audit the work.

The close-out audit method can also include creating a three-dimensional (3D) model from the video capture; determining equipment location from the 3D model; measuring distances between the equipment and within the equipment to determine actual spatial location; and determining connectivity between the equipment based on associated cabling from the 3D model. The close-out audit method can also include uniquely identifying the cell site components from the video capture and distinguishing in the close-out audit package. The close-out audit method can also include determining antenna height, azimuth, and down tilt angles for antennas in the cell site components from the video capture; and checking the antenna height, azimuth, and down tilt angles against predetermined specifications.

The close-out audit method can also include identifying cabling and connectivity between the cell site components from the video capture and distinguishing in the close-out audit package. The close-out audit method can also include checking a plurality of factors in the close-out audit from the video capture compared to the operator or owner's guidelines. The close-out audit method can also include checking the grounding of the cell site components from the video capture, comparing the checked grounding to the operator or owner's guidelines and distinguishing in the close-out audit package. The close-out audit method can also include checking mechanical connectivity of the cell site components to a cell tower based on the video capture and distinguishing in the close-out audit package.

In another exemplary embodiment, a system adapted for a close-out audit of a cell site subsequent to maintenance or installation work includes a network interface and a processor communicatively coupled to one another; and memory storing instructions that, when executed, cause the processor to, subsequent to the maintenance or installation work, obtain video capture of cell site components associated with the work; subsequent to the video capture, process the video capture to obtain data for the close-out audit, wherein the processing comprises identifying the cell site components associated with the work; and create a close-out audit package based on the processed video capture, wherein the close-out audit package provides verification of the maintenance or installation work and outlines that the maintenance or installation work was performed in a manner consistent with an operator or owner's guidelines.

In a further exemplary embodiment, a non-transitory computer readable medium includes instructions that, when executed, cause one or more processors to perform the steps of, subsequent to the maintenance or installation work, obtaining video capture of cell site components associated with the work; subsequent to the video capture, processing the video capture to obtain data for the close-out audit, wherein the processing comprises identifying the cell site components associated with the work; and creating a close-out audit package based on the processed video capture, wherein the close-out audit package provides verification of the maintenance or installation work and outlines that the maintenance or installation work was performed in a manner consistent with an operator or owner's guidelines.

The close-out audit package can include, without limitation, drawings, cell site component settings, test results, equipment lists, pictures, commissioning data, GPS data, Antenna height, azimuth and down tilt data, equipment data, serial numbers, cabling, etc.

3D Modeling Systems and Methods

Figure 14:
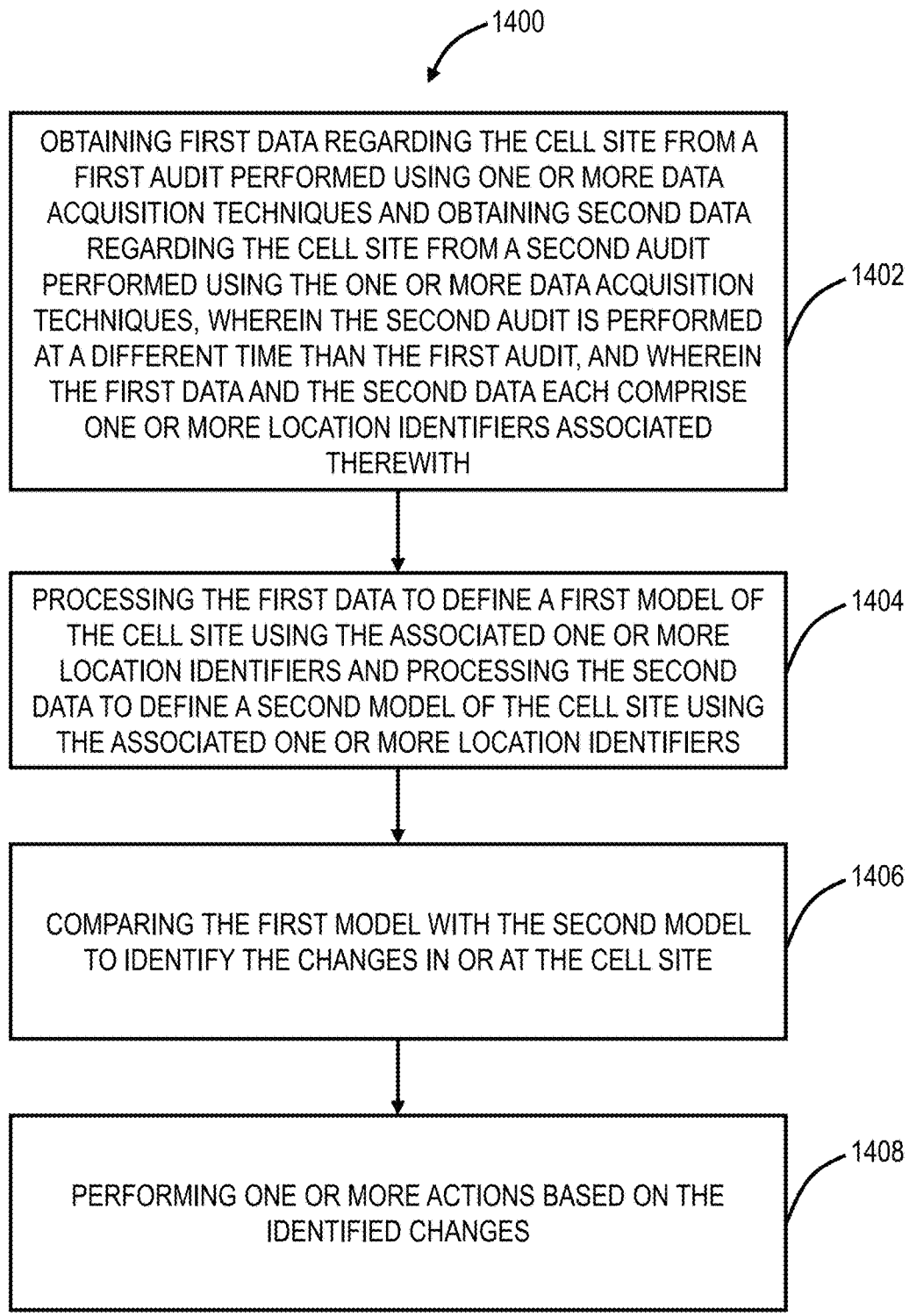
FIG. 14 is a flowchart of a 3D modeling method to detect configuration and site changes.

Referring to FIG. 14, in an exemplary embodiment, a flowchart illustrates a 3D modeling method 1400 to detect configuration and site changes. The 3D modeling method 1400 utilizes various techniques to obtain data, to create 3D models, and to detect changes in configurations and surroundings. The 3D models can be created at two or more different points in time, and with the different 3D models, a comparison can be made to detect the changes. Advantageously, the 3D modeling systems and methods allow cell site operators to manage the cell sites, including the cell site shelters, without repeated physical site surveys efficiently.

The modeling method 1400 includes obtaining first data regarding the cell site from a first audit performed using one or more data acquisition techniques and obtaining second data regarding the cell site from a second audit performed using the one or more data acquisition techniques, wherein the second audit is performed at a different time than the first audit, and wherein the first data and the second data each comprise one or more location identifiers associated therewith (step 1402); processing the first data to define a first model of the cell site using the associated one or more location identifiers and processing the second data to define a second model of the cell site using the associated one or more location identifiers (step 1404); comparing the first model with the second model to identify the changes in or at the cell site (step 1406); and performing one or more actions based on the identified changes (step 1408).

The one or more actions can include any remedial or corrective actions including maintenance, landscaping, mechanical repair, licensing from operators who install more cell site components 14 than agreed upon, and the like. The identified changes can be associated with cell site components installed on a cell tower or shelter at the cell site, and wherein the one or more actions comprises any of maintenance, licensing with operators, and removal. The identified changes can be associated with physical surroundings of the cell site, and wherein the one or more actions comprise maintenance to correct the identified changes. The identified changes can include any of degradation of gravel roads, trees obstructing a cell tower, physical hazards at the cell site, and mechanical issues with the cell tower or a shelter at the cell site.

The first data and the second data can be obtained remotely, without a tower climb or entering the shelter 52. The first model and the second model each can include a three-dimensional model of the cell site, displayed in a Graphical User Interface (GUI). The one or more data acquisition techniques can include using an Unmanned Aerial Vehicle (UAV) or various camera systems to capture the first data and the second data. The one or more data acquisition techniques can include using a fixed or portable camera to capture the first data and the second data. The one or more location identifiers can include at least two location identifiers comprising Global Positioning Satellite (GPS) and Global Navigation Satellite System (GLONASS). The second model can be created using the first model as a template for expected objects at the cell site.

In another exemplary embodiment, a modeling system adapted for detecting changes in or at a cell site includes a network interface and a processor communicatively coupled to one another; and memory storing instructions that, when executed, cause the processor to obtain first data regarding the cell site from a first audit performed using one or more data acquisition techniques and obtain second data regarding the cell site from a second audit performed using the one or more data acquisition techniques, wherein the second audit is performed at a different time than the first audit, and wherein the first data and the second data each include one or more location identifiers associated therewith; process the first data to define a first model of the cell site using the associated one or more location identifiers and process the second data to define a second model of the cell site using the associated one or more location identifiers; compare the first model with the second model to identify the changes in or at the cell site; and cause performance of one or more actions based on the identified changes.

In a further exemplary embodiment, a non-transitory computer readable medium includes instructions that, when executed, cause one or more processors to perform the steps of obtaining first data regarding the cell site from a first audit performed using one or more data acquisition techniques and obtaining second data regarding the cell site from a second audit performed using the one or more data acquisition techniques, wherein the second audit is performed at a different time than the first audit, and wherein the first data and the second data each comprise one or more location identifiers associated therewith; processing the first data to define a first model of the cell site using the associated one or more location identifiers and processing the second data to define a second model of the cell site using the associated one or more location identifiers; comparing the first model with the second model to identify the changes in or at the cell site; and performing one or more actions based on the identified changes.

3D Modeling Data Capture Systems and Methods

Figure 15:
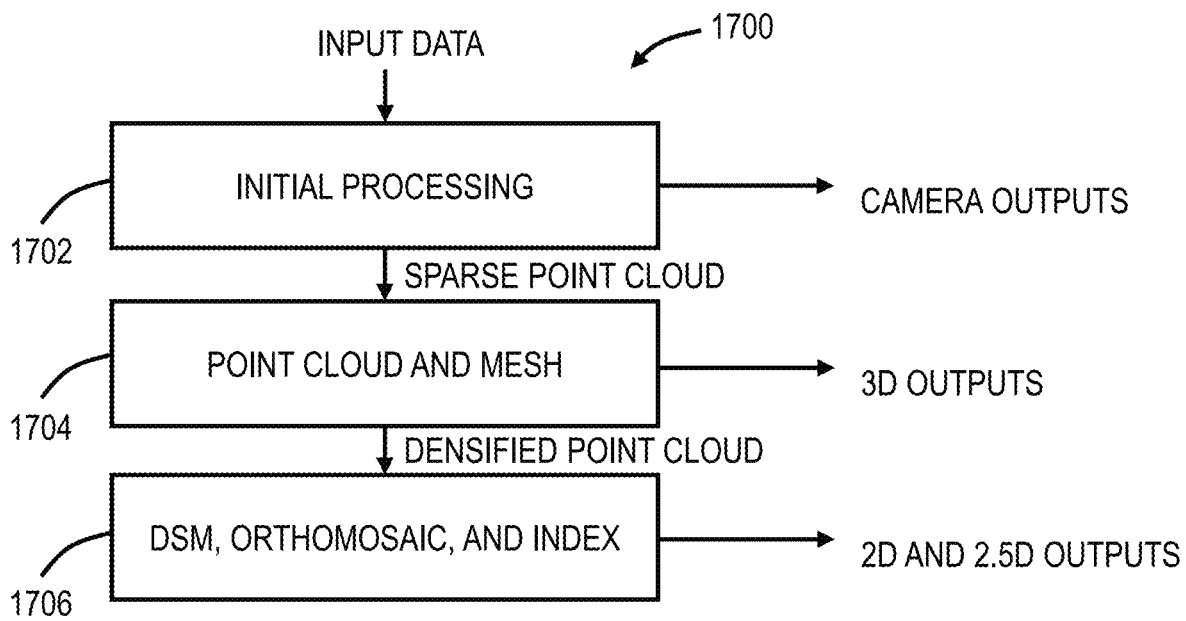
FIG. 15 is a flow diagram of a 3D model creation process.

Again, various exemplary embodiments herein describe applications and uses of 3D models of the cell site 10 the cell tower 12, and shelter 52. Further, it has been described using a UAV and other camera systems to obtain data capture for creating the 3D model. The data capture systems and methods described herein provide various techniques and criteria for properly capturing images or video using the UAV. Referring to FIG. 15, in an exemplary embodiment, a flow diagram illustrates a 3D model creation process 1700. The 3D model creation process 1700 is implemented on a server or the like. The 3D model creation process 1700 includes receiving input data, i.e., pictures and/or video. The data capture systems and methods describe various techniques for obtaining the pictures and/or video using a UAV or a fixed or movable camera at the cell site 10 or in the shelter 52. In an exemplary embodiment, the pictures can be at least 10 megapixels, and the video can be at least 4 k high definition video.

The 3D model creation process 1700 performs initial processing on the input data (step 1702). An output of the initial processing includes a sparse point cloud, a quality report, and an output file can be camera outputs. The sparse point cloud is processed into a point cloud and mesh (step 1704) providing a densified point cloud and 3D outputs. The 3D model is an output of the step 1704. Other models can be developed by further processing the densified point cloud (step 1706) to provide a Digital Surface Model (DSM), an orthomosaic, tiles, contour lines, etc.

The data capture systems and methods include capturing thousands of images or video which can be used to provide images. The data capture can include a plurality of photographs each with at least 10 megapixels and wherein the plurality of constraints can include each photograph having at least 75% overlap with another photograph. Specifically, the significant overlap allows for ease in processing to create the 3D model. The data capture can include a video with at least 4 k high definition and wherein the plurality of constraints can include capturing a screen from the video as a photograph having at least 75% overlap with another photograph captured from the video.

Multiple Camera Apparatus and Process

Figure 16:
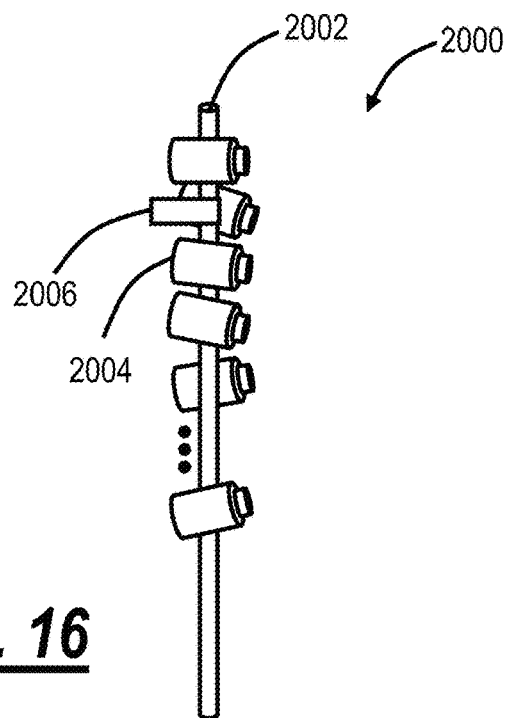
FIGS. 16 and 17 are diagrams of a multiple camera apparatus and use of the multiple camera apparatus in a shelter or cabinet or the interior of a building.
Figure 17:
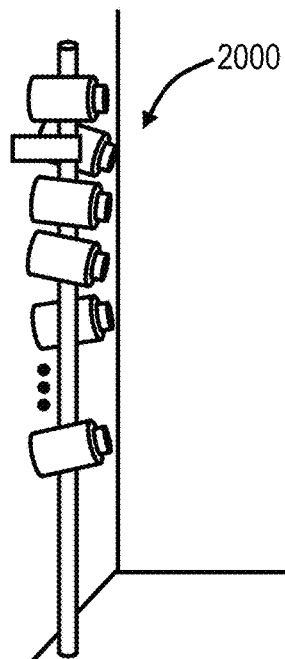

Referring to FIGS. 16 and 17, in an exemplary embodiment, diagrams illustrate a multiple camera apparatus 2000 and use of the multiple camera apparatus 2000 in the shelter or cabinet 52 or the interior 900 of the building 902. As previously described herein, the camera 930 can be used in the interior 900 for obtaining photos for 3D modeling and for virtual site surveys. The multiple camera apparatus 2000 is an improvement to the camera 930, enabling multiple photos to be taken simultaneously of different views, angles, zoom, etc. In an exemplary embodiment, the multiple camera apparatus 2000 can be operated by a technician at the building 902 to quickly, efficiently, and properly obtain photos for a 3D model of the interior 900. In another exemplary embodiment, the multiple camera apparatus 2000 can be mounted in the interior 900 and remotely controlled by an operator.

The multiple camera apparatus 2000 includes a post 2002 with a plurality of cameras 2004 disposed or attached to the post 2002. The plurality of cameras 2004 can be interconnected to one another and to a control unit 2006 on the post. The control unit 2006 can include user controls to cause the cameras 2004 to each take a photo and memory for storing the photos from the cameras 2004. The control unit 2006 can further include communication mechanisms to provide the captured photos to a system for 3D modeling (either via a wired and/or wireless connection). In an exemplary embodiment, the post 2002 can be about 6' and the cameras 2004 can be positioned to enable data capture from the floor to the ceiling of the interior 900.

The multiple camera apparatus 2000 can include other physical embodiments besides the post 2002. For example, the multiple camera apparatus 2000 can include a box with the multiple cameras 2004 disposed therein. In another example, the multiple camera apparatus 2000 can include a handheld device which includes the multiple cameras 2004.

The objective of the multiple camera apparatus 2000 is to enable a technician (either on-site or remote) to quickly capture photos (through the use of the multiple cameras 2004) for a 3D model and to properly capture the photos (through the multiple cameras 2004 have different zooms, angles, etc.). That is, the multiple camera apparatus 2000 ensures the photo capture is sufficient to accurately develop the 3D model, avoiding potentially revisiting the building 902.

In an exemplary embodiment, a data capture method includes, in the interior 900, using the multiple camera apparatus 2000. The method includes obtaining or providing the multiple camera apparatus 2000 at the shelter or cabinet 52 or the interior 900 of the building 902 and positioning the multiple camera apparatus 2000 therein. The method further includes causing the plurality of cameras 2004 to take photos based on the positioning and repositioning the multiple camera apparatus 2000 at a different location in the shelter or cabinet 52 or the interior 900 of the building 902 to take additional photos. Finally, the photos taken by the cameras 2004 are provided to a 3D modeling system to develop a 3D model of the shelter or cabinet 52 or the interior 900 of the building 902, such as for a virtual site survey.

The repositioning step can include moving the multiple camera apparatus to each corner of the shelter, the cabinet, or the interior of the building. The repositioning step can include moving the multiple camera apparatus to each row of equipment in the shelter, the cabinet, or the interior of the building. The multiple camera apparatus can include a pole with the plurality of cameras disposed thereon, each of the plurality of cameras configured for a different view. The plurality of cameras are communicatively coupled to a control unit for the causing step and/or the providing step. Each of the plurality of cameras can be configured on the multiple camera apparatus for a different view, zoom, and/or angle. The method can include analyzing the photos subsequent to the repositioning; and determining whether the photos are suitable for the 3D model, and responsive to the photos not being suitable for the 3D model, instructing a user to retake the photos which are not suitable. The method can include combing the photos of the shelter, the cabinet, or the interior of the building with photos of a cell tower at the cell site, to form a 3D model of the cell site. The method can include performing a virtual site survey of the cell site using the 3D model. The repositioning step can be based on a review of the photos taken in the causing.

In a further exemplary embodiment, a method for obtaining data capture at a cell site for developing a three dimensional (3D) thereof includes obtaining or providing the multiple camera apparatus comprising a plurality of cameras at a shelter, a cabinet, or an interior of a building and positioning the multiple camera apparatus therein; causing the plurality of cameras to simultaneously take photos based on the positioning; repositioning the multiple camera apparatus at a different location in the shelter, the cabinet, or the interior of the building to take additional photos; obtaining exterior photos of a cell tower connect to the shelter, the cabinet, or the interior of the building; and providing the photos taken by the multiple camera apparatus and the exterior photos to a 3D modeling system to develop a 3D model of the cell site, for a virtual site survey thereof.

Cell Site Verification Using 3D Modeling

Figure 18:
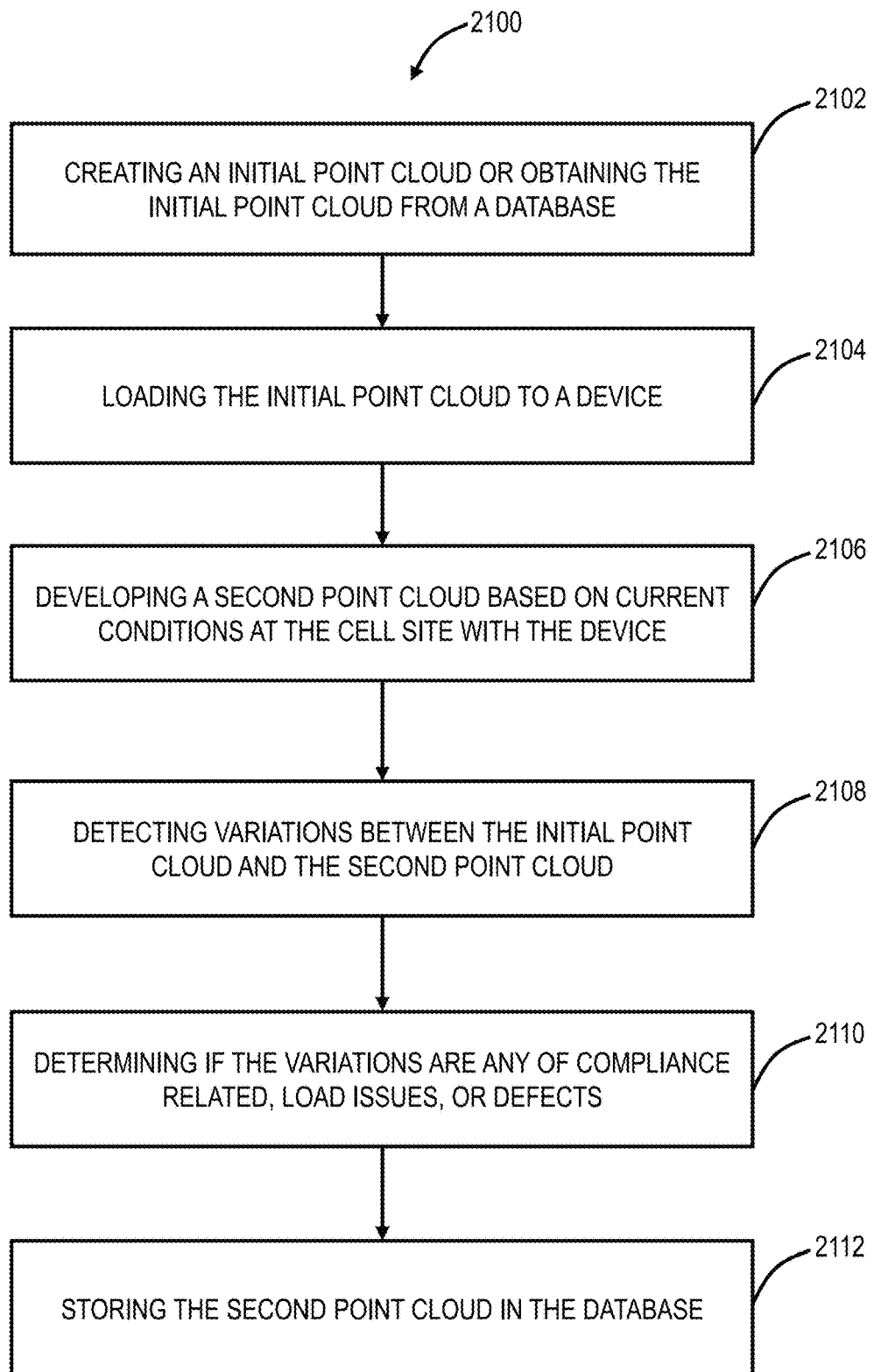
FIG. 18 is a flowchart of a method for verifying equipment and structures at the cell site using 3D modeling.

Referring to FIG. 18, in an exemplary embodiment, a flowchart illustrates a method 2100 for verifying equipment and structures at the cell site 10 using 3D modeling. As described herein, an intermediate step in the creation of a 3D model includes a point cloud, e.g., a sparse or dense point cloud. A point cloud is a set of data points in some coordinate system, e.g., in a three-dimensional coordinate system, these points are usually defined by X, Y, and Z coordinates, and can be used to represent the external surface of an object. Here, the object can be anything associated with the cell site 10, e.g., the cell tower 12, the cell site components 14, etc. As part of the 3D model creation process, a large number of points on an object's surface are determined, and the output is a point cloud in a data file. The point cloud represents the set of points that the device has measured.

Various descriptions were presented herein for site surveys, close-out audits, etc. In a similar manner, there is a need to continually monitor the state of the cell site 10. The cell site 10 verification can utilize point clouds to compare "before" and "after" data capture to detect differences.

With respect to site compliance, the cell site 10 is typically owned and operated by a cell site operator (e.g., real estate company or the like) separate from cell service providers with their associated cell site components 14. The typical transaction includes leases between these parties with specific conditions, e.g., the number of antennas, the amount of equipment, the location of equipment, etc. It is advantageous for cell site operators to periodically audit/verify the state of the cell site 10 with respect to compliance, i.e., has cell service provider A added more cell site components 14 than authorized? Similarly, it is important for cell site operators to periodically check the cell site 10 to proactively detect load issues (too much equipment on the structure of the cell tower 12), defects (equipment detached from the structure), etc.

One approach to verifying the cell site 10 is a site survey, including the various approaches to site surveys described herein, including the use of 3D models for remote site surveys. In various exemplary embodiments, the method 2100 provides a quick and automated mechanism to quickly detect concerns (i.e., compliance issues, defects, load issues, etc.) using point clouds. Specifically, the method 2100 includes creating an initial point cloud for a cell site 10 or obtaining the initial point cloud from a database (step 2102). The initial point cloud can represent a known good condition, i.e., with no compliance issues, load issues, defects, etc. For example, the initial point cloud could be developed as part of the close-out audit, etc. The initial point cloud can be created using the various data acquisition techniques described herein. Also, a database can be used to store the initial point cloud.

The initial point cloud is loaded in a device (step 2104). The point cloud data files can be stored in the memory in a processing device associated with systems of the cell site. In an exemplary embodiment, multiple point cloud data files can be stored, allowing the cameras to be deployed to perform the method 2100 at a plurality of cell sites 10. The device (i.e., UAV or camera systems) can be used to develop a second point cloud based on current conditions at the cell site 10 (step 2106). Again, a UAV and various camera systems can use the techniques described herein relative to data acquisition to develop the second point cloud. Note, it is preferable to use a similar data acquisition for both the initial point cloud and the second point cloud, e.g., similar takeoff locations/orientations, similar paths about the cell tower 12, etc. This ensures similarity in the data capture. In an exemplary embodiment, the initial point cloud is loaded to the UAV or camera system along with instructions on how to perform the data acquisition for the second point cloud. The second point cloud is developed at a current time, i.e., when it is desired to verify aspects associated with the cell site 10.

Variations are detected between the initial point cloud and the second point cloud (step 2108). The variations could be detected, in an external server, in a database, etc. The objective here is the initial point cloud and the second point cloud provides a quick and efficient comparison to detect differences, i.e., variations. The method 2100 includes determining if the variations are ant of compliance related, load issues, or defects (step 2110). Note, variations can be simply detected based on raw data differences between the point clouds. The step 2110 requires additional processing to determine what the underlying differences are. In an exemplary embodiment, the variations are detected, and, if detected, additional processing is performed by a server to actually determine the differences based on creating a 3D model of each of the point clouds. Finally, the second point cloud can be stored in the database for future processing (step 2112). An operator of the cell site 10 can be notified via any technique of any determined variations or differences for remedial action based thereon (addressing non-compliance, performing maintenance to fix defects or load issues, etc.).

Cell Site Audit and Survey Via Photo Stitching

Photo stitching or linking is a technique where multiple photos of either overlapping fields of view or adjacent fields of view are linked together to produce a virtual view or segmented panorama of an area. A common example of this approach is the so-called Street view offered by online map providers. In various exemplary embodiments, the systems and methods enable a remote user to perform a cell site audit, survey, site inspection, etc. using a User Interface (UI) with photo stitching/linking to view the cell site 10. The various activities can include any of the aforementioned activities described herein. Further, the photos can also be obtained using any of the aforementioned techniques. Of note, the photos required for a photo stitched UI are significantly less than those required by the 3D model. However, the photo stitched UI can be based on the photos captured for the 3D model, e.g., a subset of the photos. Alternatively, the photo capture for the photo stitched UI can be captured separately. Variously, the photos for the UI are captured, and a linkage is provided between photos. The linkage allows a user to navigate between photos to view up, down, left, or right, i.e., to navigate the cell site 10 via the UI. The linkage can be noted in a photo database with some adjacency indicator. The linkage can be manually entered via a user reviewing the photos or automatically based on location tags associated with the photos.

Figure 19:
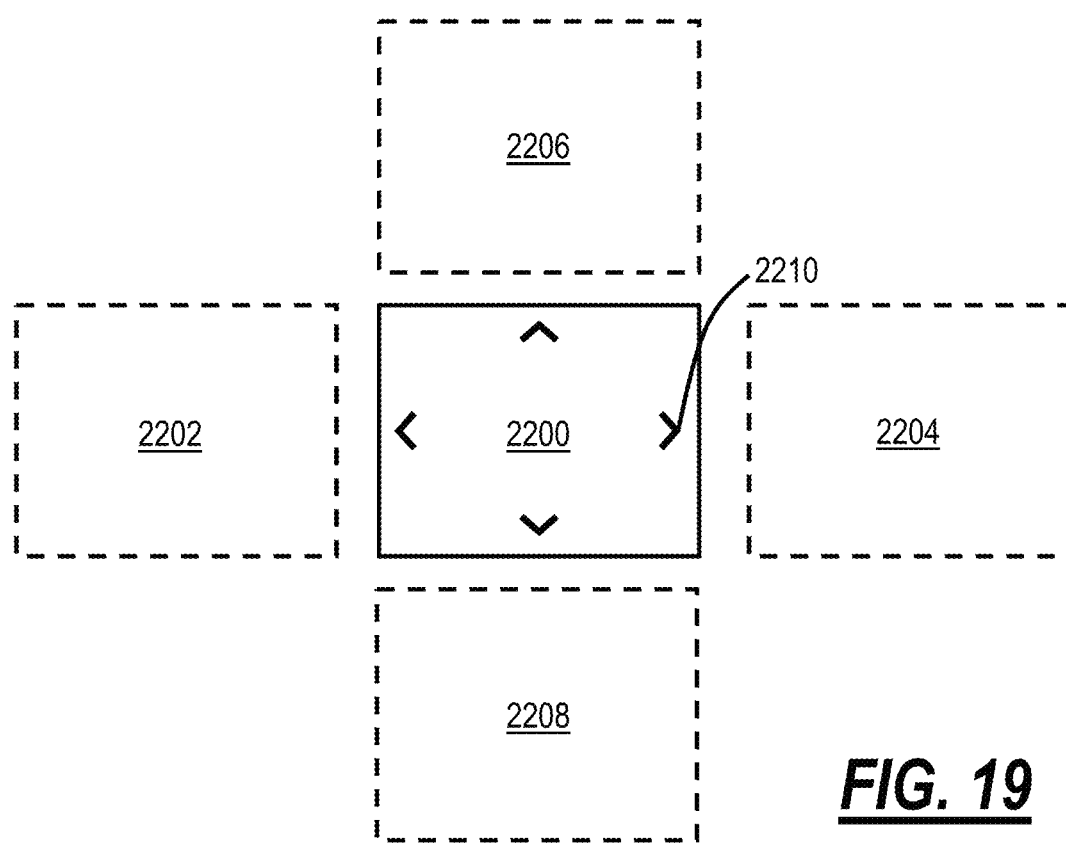
FIG. 19 is a diagram of a photo stitching User Interface (UI) for cell site audits, surveys, inspections, etc. remotely.

Referring to FIG. 19, in an exemplary embodiment, a diagram illustrates a photo stitching UI 2200 for cell site audits, surveys, inspections, etc. remotely. The UI 2200 is viewed by a computer accessing a database of a plurality of photos with the linkage between each other based on adjacency. The photos are of the cell site 10 and can include the cell tower 12 and associated cell site components as well as interior photos of the shelter or cabinet 52 of the interior 900. The UI 2200 displays a photo of the cell site 12 and the user can navigate to the left to a photo 2202, to the right to a photo 2204, up to a photo 2206, or down to a photo 2208. The navigation between the photos 2202, 2204, 2206, 2208 is based on the links between the photos. In an exemplary embodiment, a navigation icon 2210 is shown in the UI 2200 from which the user can navigate the UI 2200. Also, the navigation can include opening and closing a door to the shelter or cabinet 52.

In an exemplary embodiment, the UI 2200 can include one of the photos 2202, 2204, 2206, 2208 at a time with the navigation moving to a next photo. In another exemplary embodiment, the navigation can scroll through the photos 2202, 2204, 2206, 2208 seamlessly. In either approach, the UI 2200 allows virtual movement around the cell site 10 remotely. The photos 2202, 2204, 2206, 2208 can each be a high-resolution photo, e.g., 8 megapixels or more. From the photos 2202, 2204, 2206, 2208, the user can read labels on equipment, check cable runs, check equipment location and installation, check cabling, etc. Also, the user can virtually scale the cell tower 12 avoiding a tower climb. An engineer can use the UI 2200 to perform site expansion, e.g., where to install new equipment. Further, once the new equipment is installed, the associated photos can be updated to reflect the new equipment. It is not necessary to update all photos, but rather only the photos of new equipment locations.

The photos 2202, 2204, 2206, 2208 can be obtained using the data capture techniques described herein. The camera used for capturing the photos can be a 180, 270, or 360-degree camera. These cameras typically include multiple sensors allowing a single photo capture to capture a large view with a wide lens, fish eye lens, etc. The cameras can be mounted on a UAV for capturing the cell tower 12, the multiple camera apparatus 2000, etc. Also, the cameras can be the camera 930 in the interior 900.

Augmented Reality

The augmented reality systems and methods allow a user to experience 3D digital objects through a digital camera such as on a mobile device, tablet, laptop, etc. The 3D digital objects can be created via photogrammetry or created as a 3D model. The user can project the 3D digital objects onto in a virtual environment including real-time in a view on a phone, tablet, etc. as well as in existing virtual environments.

For example, the augmented reality systems and methods can be used in a battery and/or power plant installations such as in a cabinet or shelter. The augmented reality systems and methods can assist engineers, planners, installers, operators, etc. to visualize new equipment on site, to determine where installation should occur, to determine cable lengths, to perform engineering, to show the operators options, etc. The augmented reality systems and methods can include visualizing rack placements in shelters or head-end space for small cell applications with and without equipment already in the racks. The augmented reality systems and methods can be used to visualize outdoor small cell equipment, cabinets, cages, poles, node placements, etc.

The augmented reality systems and methods can further be used for visual shelter and cell tower placements at new locations. Further, the augmented reality systems and methods can visualize antenna placements on towers, walls, ceiling tiles, building, and other structures. Advantageously, the augmented reality systems and methods can be used to show stakeholders (cell site operators, wireless service providers, building owners, the general public, etc.) the view prior to construction. Since the view is easily manipulable, the stakeholders can use the augmented reality systems and methods to agree on project scope in advance, with very little cost for changes as there are all performed in the virtual environment. This can lead to easier project approval and general satisfaction amongst the stakeholders.

Alarming System

Alarming systems can be installed at cell sites in order to send alerts when various systems are not working as expected. An alarming system can include an alarm controller, which is coupled to the various components of a cell site. In various embodiments, the alarm controller can be installed in the shelter 52 of the cell site 10 described in the present disclosure. The alarm controller is configured to provide alarming for a plurality of components of the cell site 10 including intrusion detection, site overheating, flood, water or humidity detection, device failure, etc.

Figure 20:
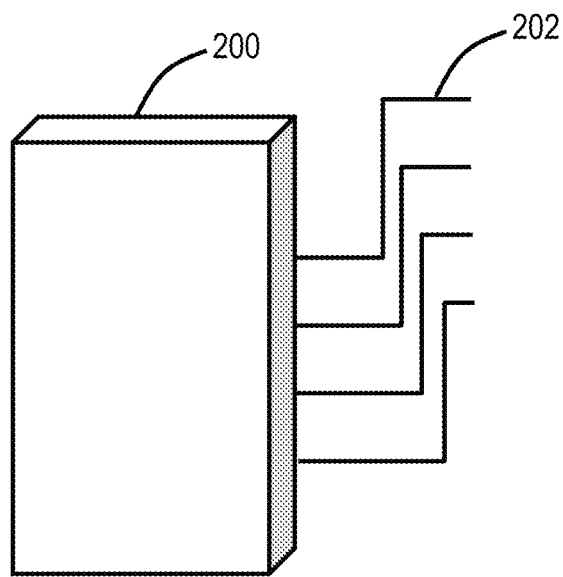
FIG. 20 is a diagram of an exemplary alarm controller.

FIG. 20 is a diagram of an exemplary alarm controller 200. The alarm controller 200 includes a plurality of cables 202 coupling the alarm controller to one or more components of the cell site. The components can include any of the described components/devices associated with the operation of the cell site, and any components associated with the alarming system. Components associated with the alarming system (alarming devices) can include intrusion detection devices, humidity detection devices, and other devices of the like. For example, the cables 202 can couple the alarm controller to various components in the shelter, such as the shelter shown in FIG. 13. The cables 202 can additionally be coupled to various alarming components, such as humidity detection devices, intrusion detection devices, etc.

Figure 21:
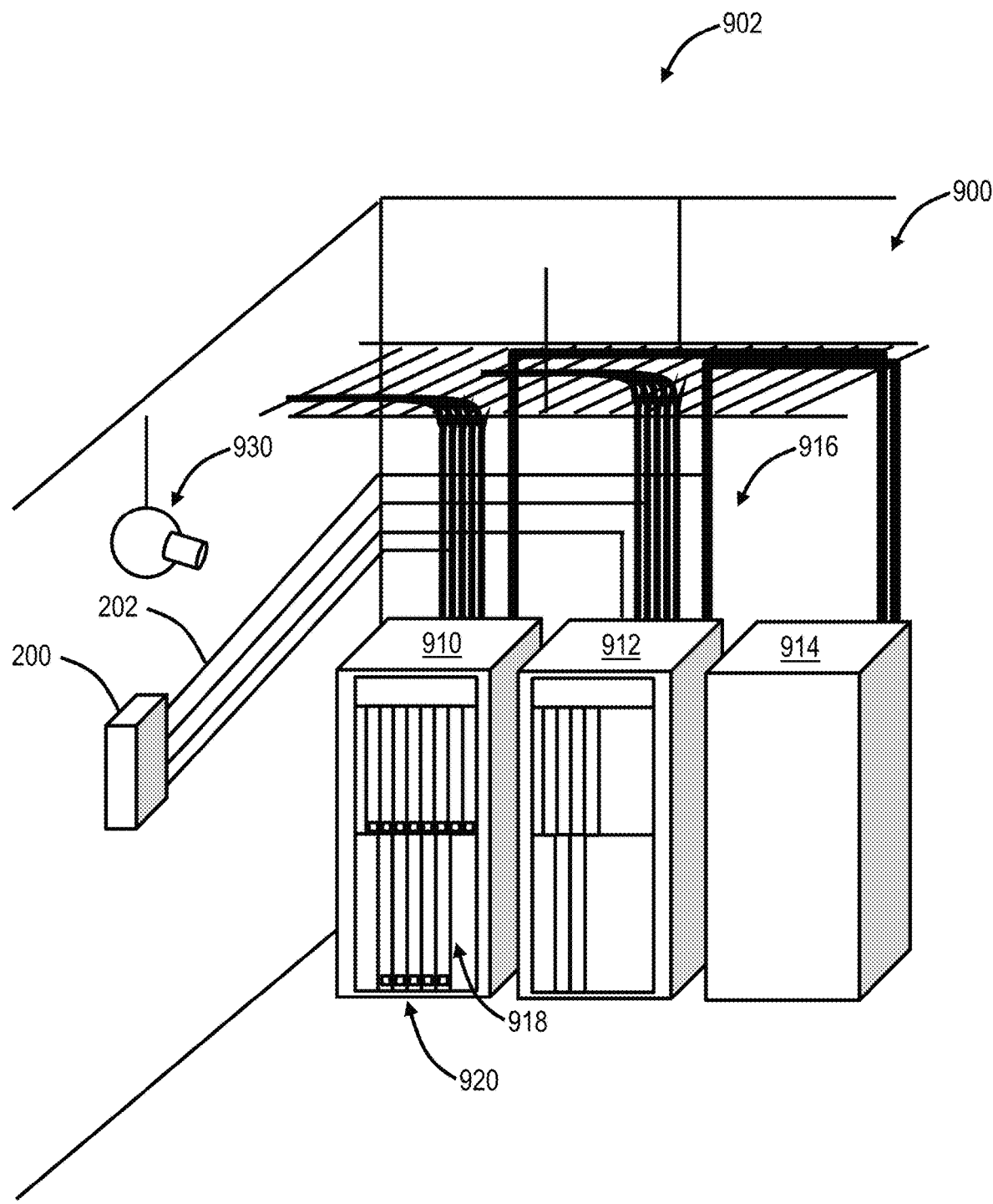
FIG. 21 is a diagram of an exemplary interior of a building, such as a shelter or cabinet, at the cell site including an alarm controller.

FIG. 21 is a diagram of an exemplary interior of a building, such as a shelter or cabinet, at the cell site including an alarming system. Again, the building 902 houses equipment associated with the cell site 10 such as wireless RF terminals 910 (e.g., LTE terminals), wireless backhaul equipment 912, power distribution 914, and the like. Photo data capture can be performed by a fixed, rotatable camera 930 located in the interior 900. The camera 930 can be communicatively coupled to a Data Communication Network (DCN), such as through the wireless backhaul equipment 912 or the like. The camera 930 can be remotely controlled, such as by an engineer performing a site survey from his or her office. In various embodiments, the camera apparatus 2000 of FIGS. 16 and 17 are contemplated in the building 902 (i.e., shelter 52).

The interior 900 includes an alarming system which includes an alarm controller 200 coupled to the equipment (components) inside of the building 902. A plurality of cables 202 couple the alarm controller 200, via inputs of the alarm controller, to the components. Again, the components can include any of the described components, devices, and equipment associated with the operation of the cell site, and any components associated with the alarming system inside or outside of the building 902. In various embodiments, the cables 202 are each labeled/tagged, wherein the installation process includes tagging all cables 202 associated with components to identify input and outputs. For example, tagging a cable 202 for intrusion detection that extends and connects to contacts on a cell site door, indicating the cable is for security, intrusion detection, going to the door contacts, or some other representation of the final location and connection of the cable.

Figure 22:
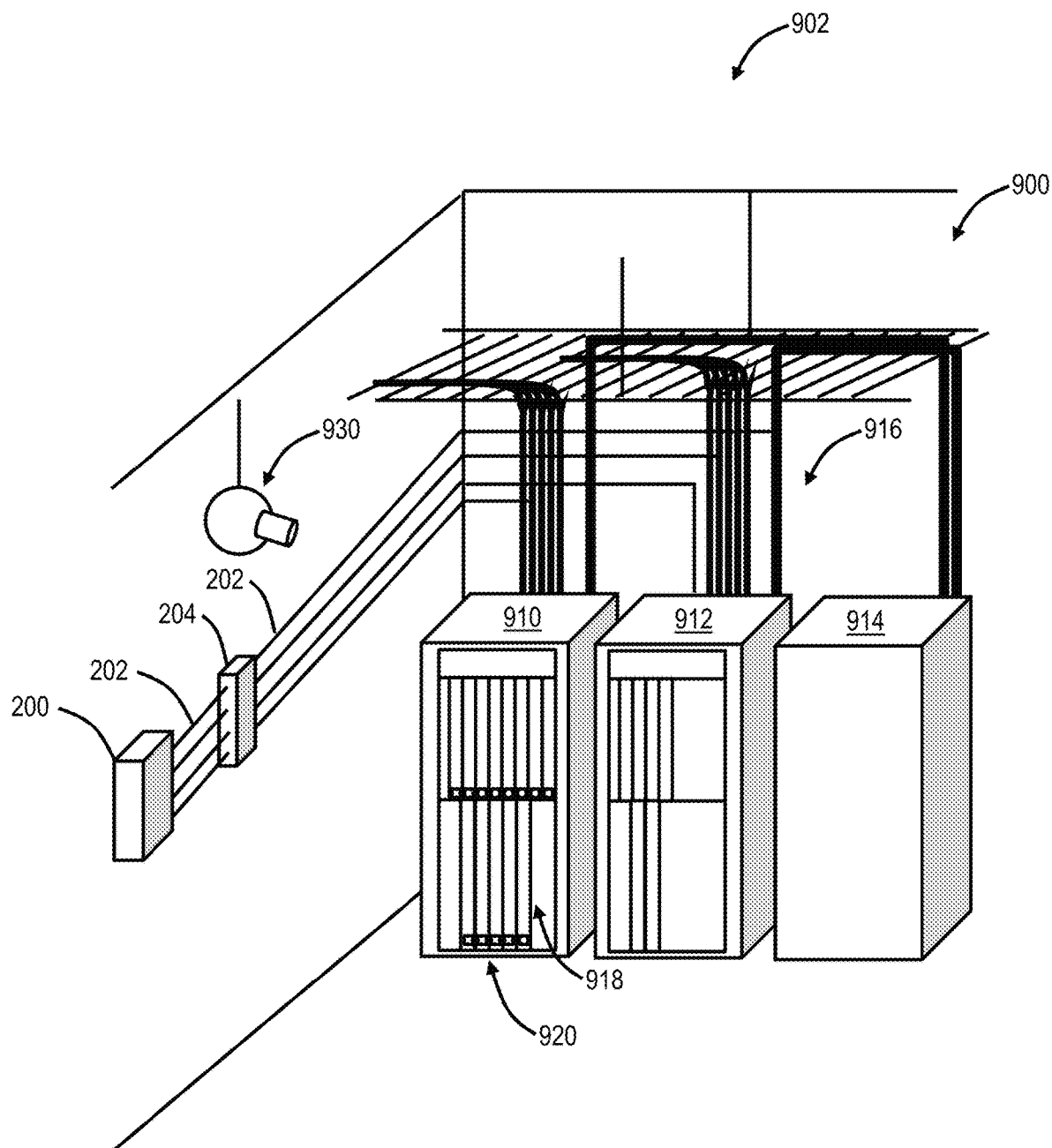
FIG. 22 is a diagram of an exemplary interior of a building, such as a shelter or cabinet, at the cell site including an alarm controller and alarm block.

FIG. 22 is a diagram of an exemplary interior of a building, such as a shelter or cabinet, at the cell site including an alarm controller and alarm block. Again, the interior 900 includes an alarm controller 200 coupled to the components inside of the building 902. A plurality of cables 202 couple the alarm controller 200 to the components. The components in the building 902 (shelter) can include any of Heating, Ventilation, and Air Conditioning (HVAC) units, batteries, routers, power plants, and such. In various embodiments, an alarm block 204 is utilized in the installation process. Various installation methods include Installing and labeling cables 202 to run through an alarm block 204 to act as a central point for connecting the alarm cabling 202 to devices, and potentially fiber, internet, or a router for communication outside of the cell site.

In various embodiments, the cameras (i.e., camera apparatus 2000 or camera 930) described herein are adapted to detect the tags, and include them in the various 3D models for audits, verification, etc. Additionally, the tags can be used by the cameras to provide a close-out audit package. Again, a close-out audit is done to document and verify the work performed at the cell site 10, including interiors of buildings such as the shelter 52 (building 902). Additionally, the cameras are adapted to verify the installation of the alarm controller 200 and alarm block 204, as well as the cables 202 to verify proper connection to the various components. Again, the components can be any cell site component, equipment, or device inside or outside of the shelter 52.

Figure 23:
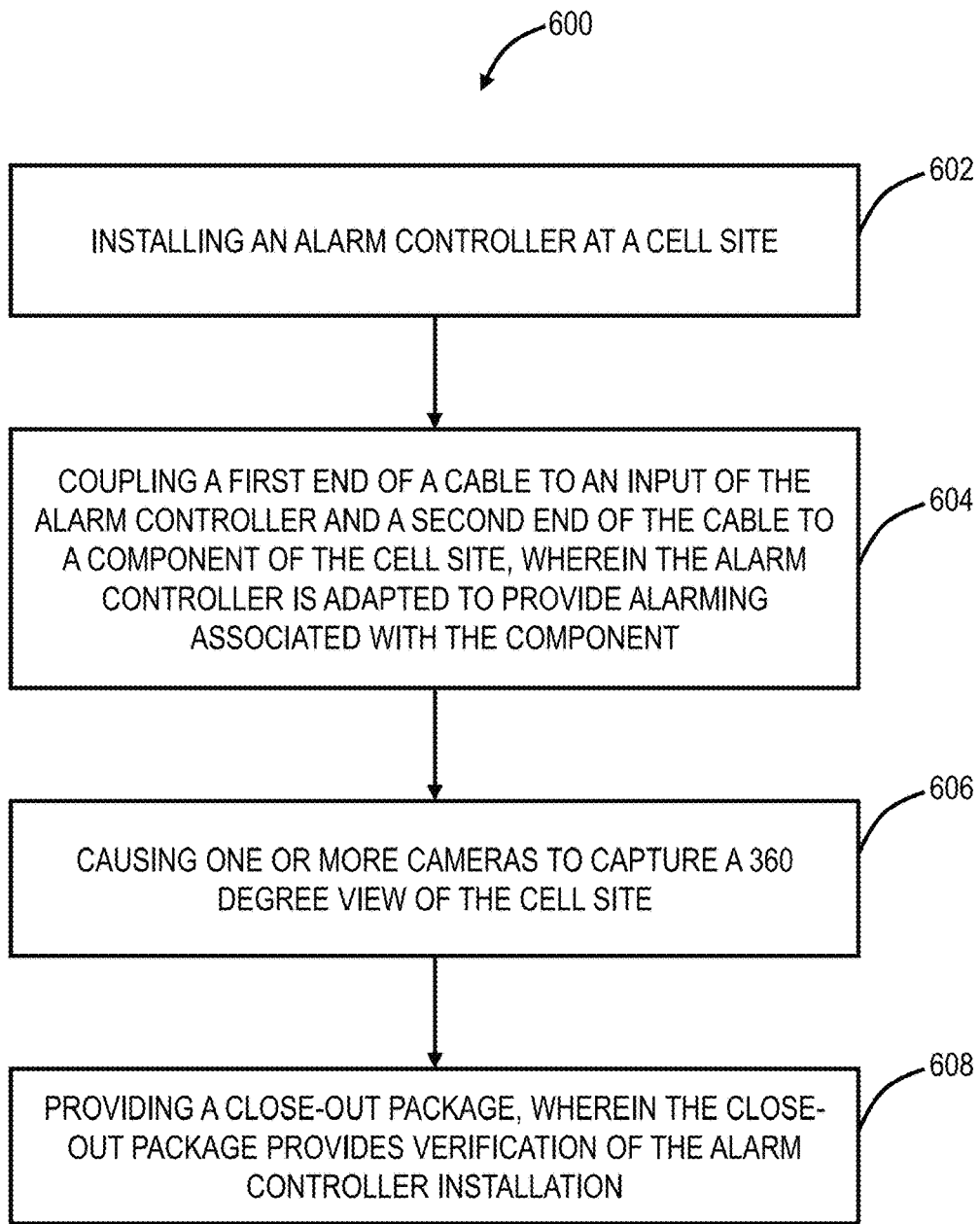
FIG. 23 is a flow diagram of an alarm controller installation process.

FIG. 23 is a flow diagram of an alarm controller installation process 600. The process 600 includes installing an alarm controller at a cell site (step 602); coupling a first end of a cable to an input of the alarm controller and a second end of the cable to a component of the cell site, wherein the alarm controller is adapted to provide alarming associated with the component (step 604); causing one or more cameras to capture a 360 degree view of the cell site (step 606); and providing a close-out package, wherein the close-out package provides verification of the alarm controller installation.

In various embodiments, the process further includes, repeating the coupling for a plurality of cables and components, wherein the alarm controller is adapted to provide alarming associated with the plurality of components. The alarm controller can be installed in a shelter of the cell site, and the plurality of cables can be coupled to the plurality of components within the shelter of the cell site. The steps can include causing the one or more cameras to capture a 360 degree view of an interior of the shelter. The steps can further include verifying that the plurality of cables are correctly coupled based on the 360 degree view. The steps can further include attaching one or more tags to each of the plurality of cables for identification. The one or more tags identify each cable based on which input of the alarm controller and which component the cable is coupled. The one or more tags are positioned to be visible in the 360 degree view. The plurality of components are any of components associated with the operation of the cell site, and alarming devices. Causing the one or more cameras to capture a 360 degree view of the cell site can be performed remotely. The steps can further include sending the close-out package to one or more of a cell site owner and a cell site operator. The steps can further include creating a three dimensional (3D) model of the cell site, and performing a virtual site survey to verify the installation of the alarming system. The one or more cameras can include any of a camera apparatus and a mobile device adapted to capture photo and video.

Figure 24:
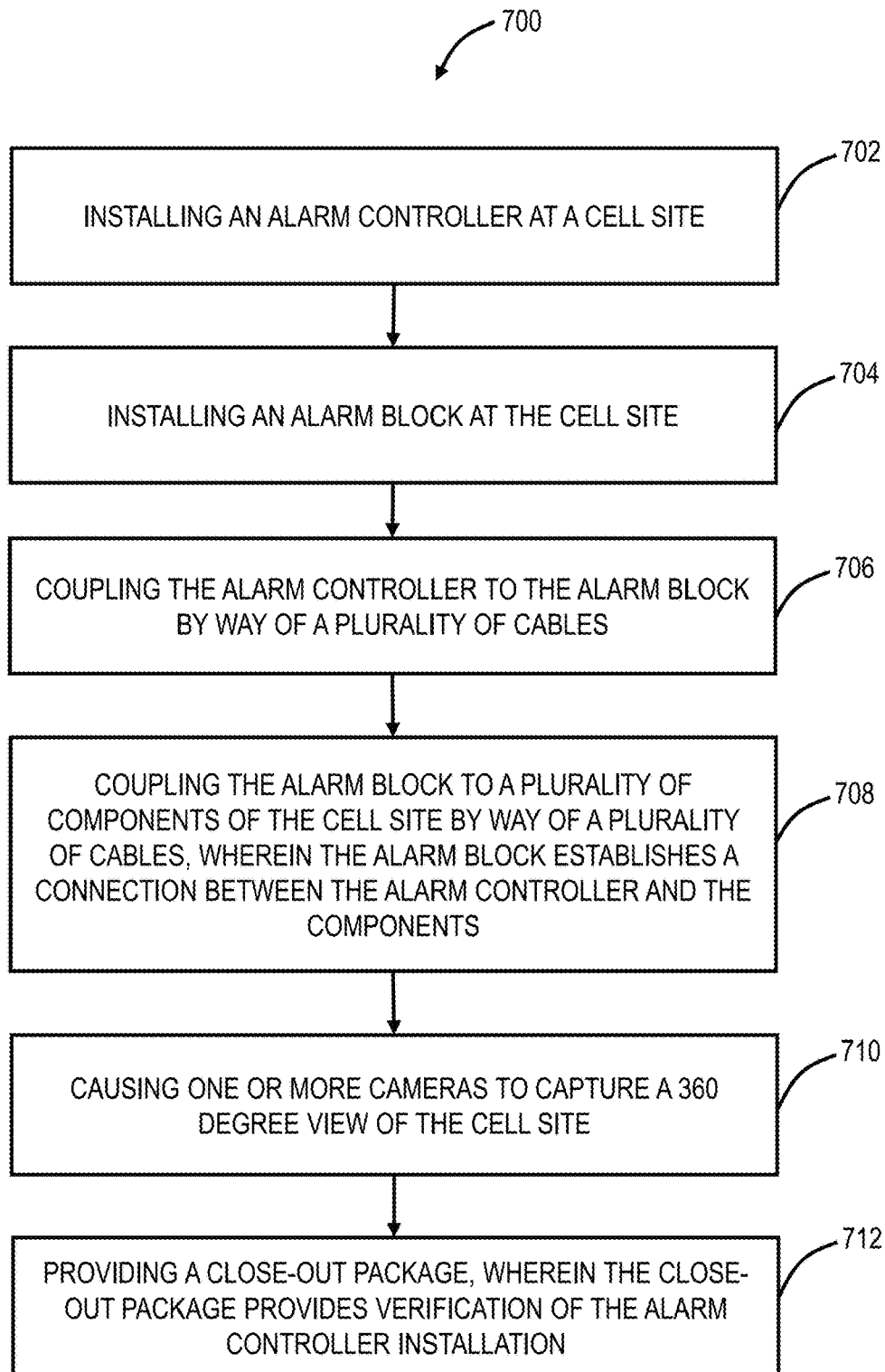
FIG. 24 is a flow diagram of an alarm controller and alarm block installation process.

FIG. 24 is a flow diagram of an alarm controller and alarm block installation process 700. The process 700 includes installing an alarm controller at a cell site (step 702); installing an alarm block at the cell site (step 704); coupling the alarm controller to the alarm block by way of a plurality of cables (step 706); coupling the alarm block to a plurality of components of the cell site by way of a plurality of cables, wherein the alarm block establishes a connection between the alarm controller and the components (step 708); causing one or more cameras to capture a 360 degree view of the cell site (step 710); and providing a close-out package, wherein the close-out package provides verification of the alarm controller installation (step 712).

Various embodiments additionally include, wherein the alarm controller and alarm block are installed in a shelter of the cell site, and the plurality of cables are coupled to the plurality of components within the shelter of the cell site. The steps can include causing the one or more cameras to capture a 360 degree view of an interior of the shelter. The steps can further include verifying that the plurality of cables are correctly coupled based on the 360 degree view. The steps can further include attaching one or more tags to each of the plurality of cables for identification. The one or more tags identify each cable based on their connection between the alarm controller and the alarm block. The one or more tags identify each cable based on their connection between the alarm block and the components. The one or more tags are positioned to be visible in the 360 degree view. The plurality of components are any of components associated with the operation of the cell site, and alarming devices. Causing the one or more cameras to capture a 360 degree view of the cell site can be performed remotely. The steps can further include sending the close-out package to one or more of a cell site owner and a cell site operator. The steps can further include creating a three dimensional (3D) model of the cell site, and performing a virtual site survey to verify the installation of the alarming system. The one or more cameras include any of a camera apparatus and a mobile device adapted to capture photo and video.

Figure 25:
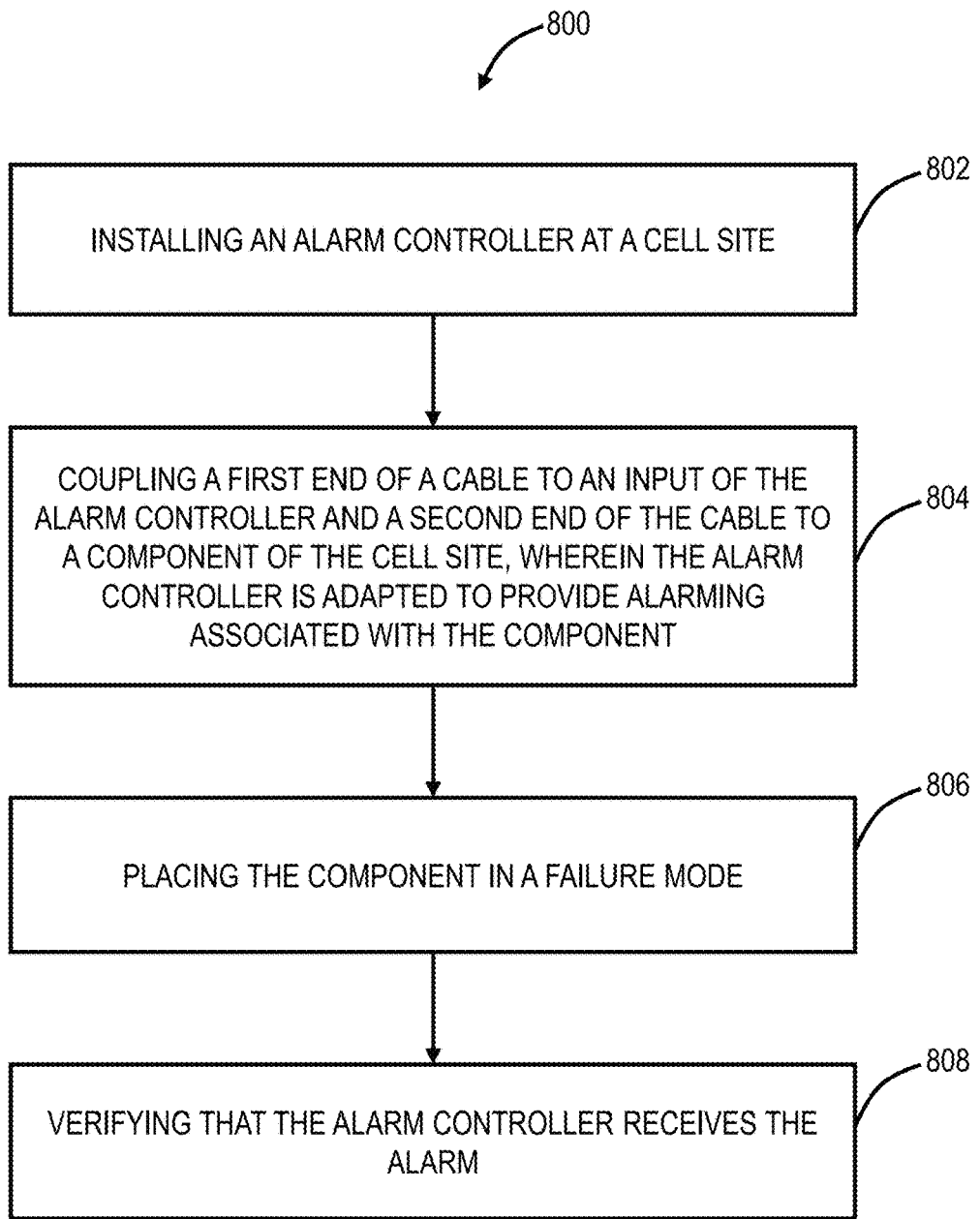
FIG. 25 is a flow diagram of an alarming system installation and verification process.

FIG. 25 is a flow diagram of an alarming system installation and verification process 800. The process 800 includes installing an alarm controller at a cell site (step 802); coupling a first end of a cable to an input of the alarm controller and a second end of the cable to a component of the cell site, wherein the alarm controller is adapted to provide alarming associated with the component (step 804); placing the component in a failure mode (step 806); and verifying that the alarm controller receives the alarm (step 808).

Various embodiments additionally include, verifying that an operations center receives the alarm. The coupling can be repeated for a plurality of cables and components, wherein the alarm controller is adapted to provide alarming associated with the plurality of components. Each of the plurality of components are placed in a failure mode, and the verifying includes verifying that the alarm controller receives an alarm from each of the components. The verifying includes verifying that the alarm controller receives each of the alarms at a correct input of the alarm controller. The placing and verifying can be performed remotely. The component is any of a component associated with the operation of the cell site, and an alarming device. The steps can further include causing one or more cameras to capture a 360 degree view of the cell site; and verifying that the alarm controller receives the alarm based on the 360 degree view. The one or more cameras can include any of a camera apparatus and a mobile device adapted to capture photo and video. The steps can further include sending a close-out package to one or more of a cell site owner and a cell site operator based on the verifying. The alarming system can further include an alarm block, and the steps can further include installing the alarm block at the cell site; coupling the alarm controller to the alarm block by way of a plurality of cables; coupling the alarm block to a plurality of components of the cell site by way of a plurality of cables, wherein the alarm block establishes a connection between the alarm controller and the components; and placing the components in a failure mode. The verifying can include verifying that the alarm block correctly transmits the alarms of each of the plurality of components to the alarm controller.

The verifying can include determining that the alarm controller receives the alarms by checking alarm status via a computer system communicatively coupled to the alarming system. The computer system can additionally provide indicators, for both the alarm controller and alarm block, to indicate if various components are coupled correctly. The verifying can also be based on visually determining correct alarming based on visual lights either seen via the 360 degree view, or by a technician. An alarm can additionally be verified based on sound. Placing a component in a failure mode can include causing the component to send a signal to the alarming system to indicate an alarm. The placing of the component in a failure mode can be performed remotely, or on site by a technician.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of installing an alarming system at a cell site, the method comprising steps of:
    installing an alarm controller at a cell site;
    installing an alarm block at the cell site, wherein the alarm block enables a transmission of a signal;
    coupling the alarm controller to the alarm block by way of a plurality of cables;
    coupling the alarm block to a plurality of components of the cell site by way of a plurality of cables, wherein the alarm block establishes a connection between the alarm controller and the components;
    causing one or more cameras to capture a 360 degree view of the cell site; and
    providing a close-out package, wherein the close-out package provides verification of the alarm controller installation; and
    attaching one or more tags to each of the plurality of cables for identification, the tags are configured to be used by the one or more cameras to provide the close-out package.

2. The method of claim 1, wherein the alarm controller and alarm block are installed in a shelter of the cell site, and the plurality of cables are coupled to the plurality of components within the shelter of the cell site.

3. The method of claim 2, wherein the steps comprise causing the one or more cameras to capture a 360 degree view of an interior of the shelter.

4. The method of claim 3, wherein the steps further comprise verifying that the plurality of cables are correctly coupled based on the 360 degree view.

5. The method of claim 1, wherein the one or more tags identify each cable based on their connection between the alarm controller and the alarm block.

6. The method of claim 1, wherein the one or more tags identify each cable based on their connection between the alarm block and the components.

7. The method of claim 1, wherein the one or more tags are positioned to be visible in the 360 degree view.

8. The method of claim 1, wherein the plurality of components are any of components associated with an operation of the cell site, and alarming devices communicatively coupled to the alarm block and configured for detection.

9. The method of claim 1, wherein causing the one or more cameras to capture a 360 degree view of the cell site is performed remotely.

10. The method of claim 1, wherein the steps further comprise sending the close-out package to one or more of a cell site owner and a cell site operator.

11. The method of claim 1, wherein the steps further comprise creating a three dimensional (3D) model of the cell site.

12. The method of claim 11, wherein the steps further comprise performing a virtual site survey to verify the installation of the alarming system.

13. The method of claim 1, wherein the one or more cameras include any of a camera apparatus and a mobile device adapted to capture photo and video.

* * * * *